United States Patent
Rusanovskyy et al.

(10) Patent No.: US 11,095,896 B2
(45) Date of Patent: Aug. 17, 2021

(54) VIDEO CODING WITH CONTENT ADAPTIVE SPATIALLY VARYING QUANTIZATION

(71) Applicant: QUALCOMM Incorporated, San Diego, CA (US)

(72) Inventors: Dmytro Rusanovskyy, San Diego, CA (US); Adarsh Krishnan Ramasubramonian, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 31 days.

(21) Appl. No.: 16/155,344

(22) Filed: Oct. 9, 2018

(65) Prior Publication Data

US 2019/0116361 A1 Apr. 18, 2019

Related U.S. Application Data

(60) Provisional application No. 62/571,732, filed on Oct. 12, 2017.

(51) Int. Cl.
*H04N 19/126* (2014.01)
*H04N 19/36* (2014.01)
(Continued)

(52) U.S. Cl.
CPC .......... *H04N 19/126* (2014.11); *H04N 19/14* (2014.11); *H04N 19/176* (2014.11);
(Continued)

(58) Field of Classification Search
CPC ... H04N 19/126; H04N 19/176; H04N 19/198
See application file for complete search history.

(56) References Cited

U.S. PATENT DOCUMENTS 8,032,367 B2 * 10/2011 Takamizawa ......... G10L 19/173
704/229
2003/0219070 A1 * 11/2003 Turaga .................. H04N 17/004
375/240.03
(Continued)

OTHER PUBLICATIONS

Algorithm Description of Joint Exploration Test Model 7 (JEM7), 119. MPEG Meeting; Jul. 17, 2017-Jul. 21, 2017; Torino; (Motion Picture Expert Group or ISO/IEC JTC1/SC29/WG11), No. N17055, Oct. 6, 2017, XP030023716, 48 Pages.
(Continued)

*Primary Examiner* — Jeremiah C Hallenbeck-Huber
(74) *Attorney, Agent, or Firm* — Shumaker & Sieffert, P.A.

(57) ABSTRACT

A video encoder may be configured to apply a multi-stage quantization process, where residuals are first quantized using an effective quantization parameter derived from the statistics of the samples of the block. The residual is then further quantized using a base quantization parameter that is uniform across a picture. A video decoder may be configured to decode the video data using the base quantization parameter. The video decoder may further be configured to estimate the effective quantization parameter from the statistics of the decoded samples of the block. The video decoder may then use the estimated effective quantization parameter for use in determining parameters for other coding tools, including filters.

30 Claims, 12 Drawing Sheets

(51) Int. Cl.
  *H04N 19/196* (2014.01)
  *H04N 19/463* (2014.01)
  *H04N 19/14* (2014.01)
  *H04N 19/176* (2014.01)
  *H04N 19/186* (2014.01)
(52) U.S. Cl.
  CPC ......... *H04N 19/186* (2014.11); *H04N 19/197* (2014.11); *H04N 19/198* (2014.11); *H04N 19/36* (2014.11); *H04N 19/463* (2014.11)

(56) References Cited

U.S. PATENT DOCUMENTS

| | | | |
|---|---|---|---|
| 2005/0286629 A1* | 12/2005 | Dumitras | H04N 19/61 375/240.03 |
| 2007/0140334 A1* | 6/2007 | Sun | H04N 19/126 375/240.03 |
| 2010/0091842 A1* | 4/2010 | Ikeda | H04N 19/176 375/240.03 |
| 2013/0223513 A1* | 8/2013 | Chen | H04N 19/147 375/240.02 |
| 2015/0304657 A1* | 10/2015 | Lu | H04N 19/44 375/240.29 |
| 2016/0050442 A1* | 2/2016 | Saxena | H04N 19/82 375/240.29 |
| 2016/0057418 A1* | 2/2016 | Lei | H04N 19/124 375/240.03 |
| 2017/0127062 A1* | 5/2017 | Zhao | H04N 19/124 |
| 2017/0332098 A1 | 11/2017 | Rusanovskyy et al. | |

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.
Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.
Francois E., et al., "AHG7: Experiments on Using Local QP Adaptation in the Context of an HLG Container," 7. JVET Meeting, Jul. 13, 2017-Jul. 21, 2017, Torino, (The Joint Video Exploration Team of ISO/IEC JTC1/SC29/WG11 and ITU-T SG.16 ); URL: http://phenix.int-evry.fr/jvet/, No. JVET-G0123, Jul. 7, 2017 (Jul. 7, 2017), XP030150928, pp. 1-12.
International Search Report and Written Opinion—PCT/US2018/055211—ISA/EPO—Dec. 14, 2018.
ITU-R Recommendation BT.2020-2, "Parameter values for ultra-high definition television systems for production and International programme exchange," Oct. 2015, 8 pp.
ITU-R Recommendation BT.709-6, "Parameter values for the HDTV standards for production and international programme exchange," Jun. 2015, pp. 1-17.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Karczewicz M., et al., "Rate distortion optimized quantization", 34. VCEG Meeting; 83. MPEG Meeting; Dec. 1, 2008-Jan. 1, 2008; Antalya; (Video Coding Experts Group of ITU-T SG.16), No. VCEG-AH21, Jan. 9, 2008, XP030003559, 3 Pages. ISSN: 0000-0138.
Kim J., et al., "Analysis of Visual Quality Improvements Provided by Known Tools for HDR Content," Proceedings of SPIE, [Proceedings of SPIE ISSN 0277-786X vol. 10524], SPIE, US, vol. 9971, Sep. 27, 2016 (Sep. 27, 2016), pp. 99710A-1 to 99710A-12, XP060078009.
"Reference Electro-Optical Transfer Function for Flat Panel Displays used in HDTV Studio Production," ITU-R BT.1886, ITU-R Radiocommunication Sector of ITU, BT Series, Mar. 2011, 7 pp.
Li X., et al., "Adaptive De-Quantization Offset," 5. JCT-VC Meeting, 96. MPEG Meeting, Mar. 16, 2011-Mar. 23, 2011, Geneva, (Joint Collaborative Team on Video Coding of ISO/IEC JTC1/SC291WG11 and ITU-T SG.16 ), URL: http://wftp3.itu.int/av-arch/jctvc-site/, No. JCTVC-E091, Mar. 10, 2011 (Mar. 10, 2011), XP030008597, pp. 1-6.
Naccari M.,et al., "Intensity dependent spatial quantization with application in HEVC," 2013 IEEE International Conference on Multimedia and Expo (ICME), Jul. 15, 2013 (Jul. 15, 2013), XP032488115, 10 pp., ISSN: 1945-7871, DOI: 10.1109/ICME.2013.6607535 [retrieved on Sep. 24, 2013].
Qualcomm Inc., "Dynamic Range Adjustment SEI to Enable High Dynamic Range Video Coding with Backward-Compatible Capability," International Telecommunication Union, Study Group 16, No. Com 16-C 1027-E, Sep. 2015, XP030100746, pp. 1-11.
Segall A., et al., "AHG on HDR and WCG: Average Luma Controlled Adaptive dQP," 23. JCT-VC Meeting, Feb. 19, 2016-Feb. 26, 2016, San Diego, (Joint Collaborative Team on Video Coding of ISO/IEC JTC1/SC29/WG11 and ITU-T SG.16 ), URL: http://wftp3.itu/int/av-arch/jctvc-site/, No. JCTVC-W0054, Feb. 9, 2016 (Feb. 9, 2016), XP030117826, pp. 1-3.
Sharp Corporation., "Performance Investigation of High Dynamic Range and Wide Color Gamut Video Coding Techniques," International Telecommunication Union, Study Group 16, No. Com 16-C 1030-E, Sep. 2015, pp. 1-27.
SMPTE Standard for Motion-Picture Film {8-mm TypeR)—Camera Aperture Image and Usage, SMPTE 231-2004, Nov. 8, 2004, 4 pp.
SMPTE Standard, "High Dynamic Range Electro-Optical Transfer Function of Mastering Reference Displays", SMPTE ST 2084:2014, The Society of Motion Picture and Television Engineers, Aug. 16, 2014, XP055225088, 14 pp, ISBN: 978-1-61482-829-7.
Zhao et al., "De-Quantization and Scaling for Next Generation Containers," (Joint Video Exploration Team (JVET) of ITU-T SG 16 WP 3 and ISO/IEC JTC 1/SC 29/WG 11 ); 2nd Meeting, San Diego, CA, USA; Feb. 20-26, 2016, documen! No. JVET-B0054, Feb. 21, 2016, 5 pp.

* cited by examiner

Example of EOTFs

VIDEO CODING WITH CONTENT ADAPTIVE SPATIALLY VARYING QUANTIZATION

This application claims the benefit of U.S. Provisional Application No. 62/571,732, filed Oct. 12, 2017, the entire content of which is incorporated by reference herein.

TECHNICAL FIELD

This disclosure relates to video coding and/or video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

The total number of color values that may be captured, coded, and displayed may be defined by a color gamut. A color gamut refers to the range of colors that a device can capture (e.g., a camera) or reproduce (e.g., a display). Often, color gamuts differ from device to device. For video coding, a predefined color gamut for video data may be used such that each device in the video coding process may be configured to process pixel values in the same color gamut. Some color gamuts are defined with a larger range of colors than color gamuts that have been traditionally used for video coding. Such color gamuts with a larger range of colors may be referred to as a wide color gamut (WCG).

Another aspect of video data is dynamic range. Dynamic range is typically defined as the ratio between the minimum and maximum brightness (e.g., luminance) of a video signal. The dynamic range of common video data used in the past is considered to have a standard dynamic range (SDR). Other example specifications for video data define color data that has a larger ratio between the minimum and maximum brightness. Such video data may be described as having a high dynamic range (HDR).

SUMMARY

This disclosure describes example processing methods (and devices configured to perform the methods) applied in the coding (e.g., encoding or decoding) loop of a video coding system. The techniques of this disclosure are applicable for coding of video data representations with non-uniformly distributed perceived just-noticeable-difference (e.g., signal-to-noise ratio) of the video data over its dynamic range. A video encoder may be configured to apply a multi-stage quantization process, where residuals are first quantized using an effective quantization parameter derived from the statistics of the samples of the block. The residual is then further quantized using a base quantization parameter that is uniform across a picture. A video decoder may be configured to decode the video data using the base quantization parameter. The video decoder may further be configured to estimate the effective quantization parameter from the statistics of the decoded samples of the block. The video decoder may then use the estimated effective quantization parameter for use in determining parameters for other coding tools, including filters. In this way, signaling overhead is saved as the effective quantization parameter is not signaled, but is estimated at the decoder side.

In one example, this disclosure describes a method of decoding video data, the method comprising receiving an encoded block of the video data, the encoded block of the video data having been encoded using an effective quantization parameter and a base quantization parameter, wherein the effective quantization parameter is a function of a quantization parameter offset added to the base quantization parameter, determining the base quantization parameter used to encode the encoded block of the video data, decoding the encoded block of the video data using the base quantization parameter to create a decoded block of video data, determining an estimate of the quantization parameter offset for the decoded block of the video data based on statistics associated with the decoded block of the video data, adding the estimate of the quantization parameter offset to the base quantization parameter to create an estimate of the effective quantization parameter, and performing one or more filtering operations on the decoded block of video data as a function of the estimate of the effective quantization parameter.

In another example, this disclosure describes a method of encoding video data, the method comprising determining a base quantization parameter for a block of the video data, determining a quantization parameter offset for the block of the video data based on statistics associated with the block of the video data, adding the quantization parameter offset to the base quantization parameter to create an effective quantization parameter, and encoding the block of the video data using the effective quantization parameter and the base quantization parameter.

In another example, this disclosure describes an apparatus configured to decode video data, the apparatus comprising a memory configured to store an encoded block of the video data, and one or more processors in communication with the memory, the one or more processors configured to receive the encoded block of the video data, the encoded block of the video data having been encoded using an effective quantization parameter and a base quantization parameter, wherein the effective quantization parameter is a function of a quantization parameter offset added to the base quantization parameter, determine the base quantization parameter used to encode the encoded block of the video data, decode the encoded block of the video data using the base quantization parameter to create a decoded block of video data, determine an estimate of the quantization parameter offset for the decoded block of the video data based on statistics associated with the decoded block of the video data, add the estimate of the quantization parameter offset to the base quantization parameter to create an estimate of the effective quantization parameter, and perform one or more filtering operations on the decoded block of video data as a function of the estimate of the effective quantization parameter.

In another example, this disclosure describes an apparatus configured to encode video data, the apparatus comprising a memory configured to store a block of the video data, and one or more processors in communication with the memory, the one or more processors configured to determine a base quantization parameter for the block of the video data, determine a quantization parameter offset for the block of the video data based on statistics associated with the block of the video data, add the quantization parameter offset to the base quantization parameter to create an effective quantization parameter, and encode the block of the video data using the effective quantization parameter and the base quantization parameter.

In another example, this disclosure describes an apparatus configured to decode video data, the apparatus comprising means for receiving an encoded block of the video data, the encoded block of the video data having been encoded using an effective quantization parameter and a base quantization parameter, wherein the effective quantization parameter is a function of a quantization parameter offset added to the base quantization parameter, means for determining the base quantization parameter used to encode the encoded block of the video data, means for decoding the encoded block of the video data using the base quantization parameter to create a decoded block of video data, means for determining an estimate of the quantization parameter offset for the decoded block of the video data based on statistics associated with the decoded block of the video data, means for adding the estimate of the quantization parameter offset to the base quantization parameter to create an estimate of the effective quantization parameter, and means for performing one or more filtering operations on the decoded block of video data as a function of the estimate of the effective quantization parameter.

In another example, this disclosure describes an apparatus configured to encode video data, the apparatus comprising means for determining a base quantization parameter for a block of the video data, means for determining a quantization parameter offset for the block of the video data based on statistics associated with the block of the video data, means for adding the quantization parameter offset to the base quantization parameter to create an effective quantization parameter, and means for encoding the block of the video data using the effective quantization parameter and the base quantization parameter.

In another example, this disclosure describes a non-transitory computer-readable storage medium storing instructions that, when executed, cause one or more processors to receive the encoded block of the video data, the encoded block of the video data having been encoded using an effective quantization parameter and a base quantization parameter, wherein the effective quantization parameter is a function of a quantization parameter offset added to the base quantization parameter, determine the base quantization parameter used to encode the encoded block of the video data, decode the encoded block of the video data using the base quantization parameter to create a decoded block of video data, determine an estimate of the quantization parameter offset for the decoded block of the video data based on statistics associated with the decoded block of the video data, add the estimate of the quantization parameter offset to the base quantization parameter to create an estimate of the effective quantization parameter, and perform one or more filtering operations on the decoded block of video data as a function of the estimate of the effective quantization parameter.

In another example, this disclosure describes a non-transitory computer-readable storage medium storing instructions that, when executed, cause one or more processors to determine a base quantization parameter for the block of the video data, determine a quantization parameter offset for the block of the video data based on statistics associated with the block of the video data, add the quantization parameter offset to the base quantization parameter to create an effective quantization parameter, and encode the block of the video data using the effective quantization parameter and the base quantization parameter.

The details of one or more examples are set forth in the accompanying drawings and the description below. Other features, objects, and advantages will be apparent from the description, drawings, and claims.

DETAILED DESCRIPTION

Figure 1:
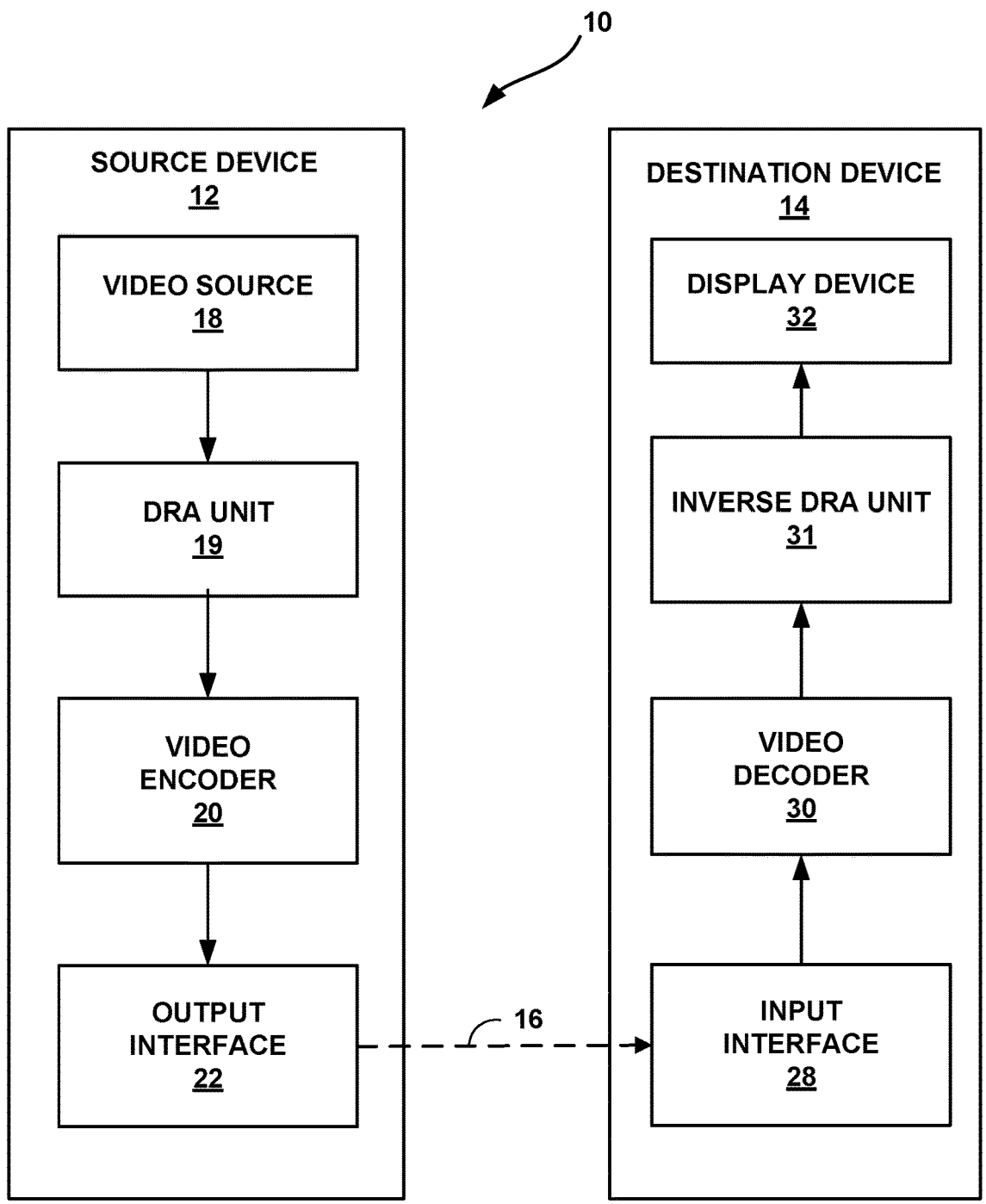
FIG. 1 is a block diagram illustrating an example video encoding and decoding system configured to implement the techniques of the disclosure.

This disclosure is related to the processing and/or coding of video data with high dynamic range (HDR) and wide color gamut (WCG) representations. More specifically, the techniques of this disclosure include content-adaptive spatially varying quantization without explicit signaling of quantization parameters (e.g., a change in a quantization parameter represented by a deltaQP syntax element) to efficiently compress HDR/WCG video signals. The techniques and devices described herein may improve compression efficiency of video coding systems utilized for coding HDR and WCG video data. The techniques of this disclosure may be used in the context of advanced video codecs, such as extensions of HEVC or next generation video coding standards.

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely High Efficiency Video coding (HEVC, also called H.265), has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip. The finalized HEVC standard is referred to as HEVC version 1. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version of the finalized HEVC standard was published in October 2014. A copy of the H.265/HEVC specification text may be downloaded from http://www.itu.int/rec/T-REC-H.265-201504-I/en.

ITU-T VCEG (Q6/16) and ISO/IEC MPEG (JTC 1/SC 29/WG 11) are now studying the potential need for standardization of future video coding technology with a compression capability that exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM7) could be downloaded from: https://jvet.hhi-.fraunhofer.de/svn/svn_HMJEMSoftware/tags/HM-16.6-JEM-7.0/. This algorithm description for JEM7 could be referred to as J. Chen, E. Alshina, G. J. Sullivan, J.-R. Ohm, J. Boyce "Algorithm description of Joint Exploration Test Model 7 (JEM7)," JVET-G1001, Torino, July 2017.

Recently, a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)."

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wired or wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, dynamic range adjustment (DRA) unit 19, video decoder 30, and display device 32. In accordance with this disclosure, DRA unit 19 of source device 12 may be configured to implement the techniques of this disclosure, including signaling and related operations applied to video data in certain color spaces to enable more efficient compression of HDR and WCG video data. In some examples, DRA unit 19 may be separate from video encoder 20. In other examples, DRA unit 19 may be part of video encoder 20. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing and coding HDR and WCG video data may be performed by any digital video encoding and/or video decoding device. Moreover, some example techniques of this disclosure may also be performed by a video preprocessor and/or video postprocessor. A video preprocessor may be any device configured to process video data before encoding (e.g., before HEVC, VVC, or other encoding). A video postprocessor may be any device configured to process video data after decoding (e.g., after HEVC, VVC, or other decoding). Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components, as well as a video preprocessor and a video postprocessor (e.g., DRA unit 19 and inverse DRA unit 31, respectively). Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

DRA unit 19 and inverse DRA unit 31 each may be implemented as any of a variety of suitable encoder circuitry, such as one or more microprocessors, DSPs, ASICs, FPGAs, discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

In some examples, video encoder 20 and video decoder 30 operate according to a video compression standard, such as ITU-T H.265/HEVC, VVC, or other next generation video coding standards.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

In JEM7, rather than using the quadtree partitioning structure of HEVC described above, a quadtree binary tree (QTBT) partitioning structure may be used. The QTBT structure removes the concepts of multiple partitions types. That is, the QTBT structure removes the separation of the CU, PU, and TU concepts, and supports more flexibility for CU partition shapes. In the QTBT block structure, a CU can have either a square or rectangular shape. In one example, a CU is first partition by a quadtree structure. The quadtree leaf nodes are further partitioned by a binary tree structure.

In some examples, there are two splitting types: symmetric horizontal splitting and symmetric vertical splitting. The binary tree leaf nodes are called CUs, and that segmentation (i.e., the CU) is used for prediction and transform processing without any further partitioning. This means that the CU, PU, and TU have the same block size in the QTBT coding block structure. In JEM, a CU sometimes consists of coding blocks (CBs) of different color components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices.

In some examples, video encoder 20 and video decoder 30 may be configured to operate according to JEM/VVC. According to JEM/VVC, a video coder (such as video encoder 20) partitions a picture into a plurality of CU. An example QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning according to JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Figure 2A:
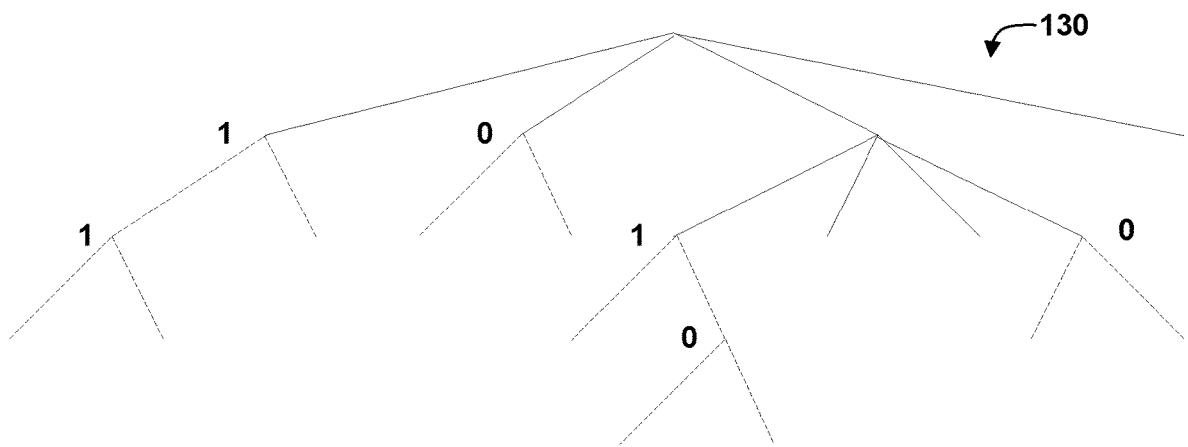
FIGS. 2A and 2B are conceptual diagrams illustrating an example quadtree binary tree (QTBT) structure, and a corresponding coding tree unit (CTU).
Figure 2B:
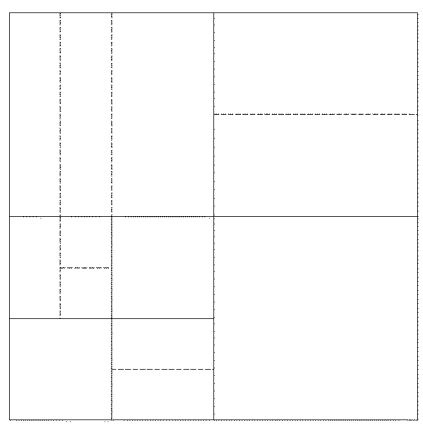

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If a node of the first level are not larger than the maximum allowed binary tree root node size (MaxBTSize), then the node can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. The binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

In some examples, JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR and/or (WCG. Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," defines parameters for HDTV (high definition television), such as standard dynamic range (SDR) and standard color gamut, and ITU-R Rec. BT.2020, "Parameter values for ultra-high definition television systems for production and international programme exchange," specifies UHDTV (ultra-high definition television) parameters, such as HDR and WCG. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the minimum and maximum brightness (e.g., luminance) of the video signal. Dynamic range may also be measured in terms of 'f-stop,' where one f-stop corresponds to a doubling of a signal's dynamic range. In MPEG's definition, HDR content is content that features brightness variation with more than 16 f-stops. In some terms, levels between 10 and 16 f-stops are considered as intermediate dynamic range but in other definitions, are considered HDR. In some examples of this disclosure, HDR video content may be any video content that has a higher dynamic range than traditionally used video content with a standard dynamic range (e.g., video content as specified by ITU-R Rec. BT.709).

Figure 3:
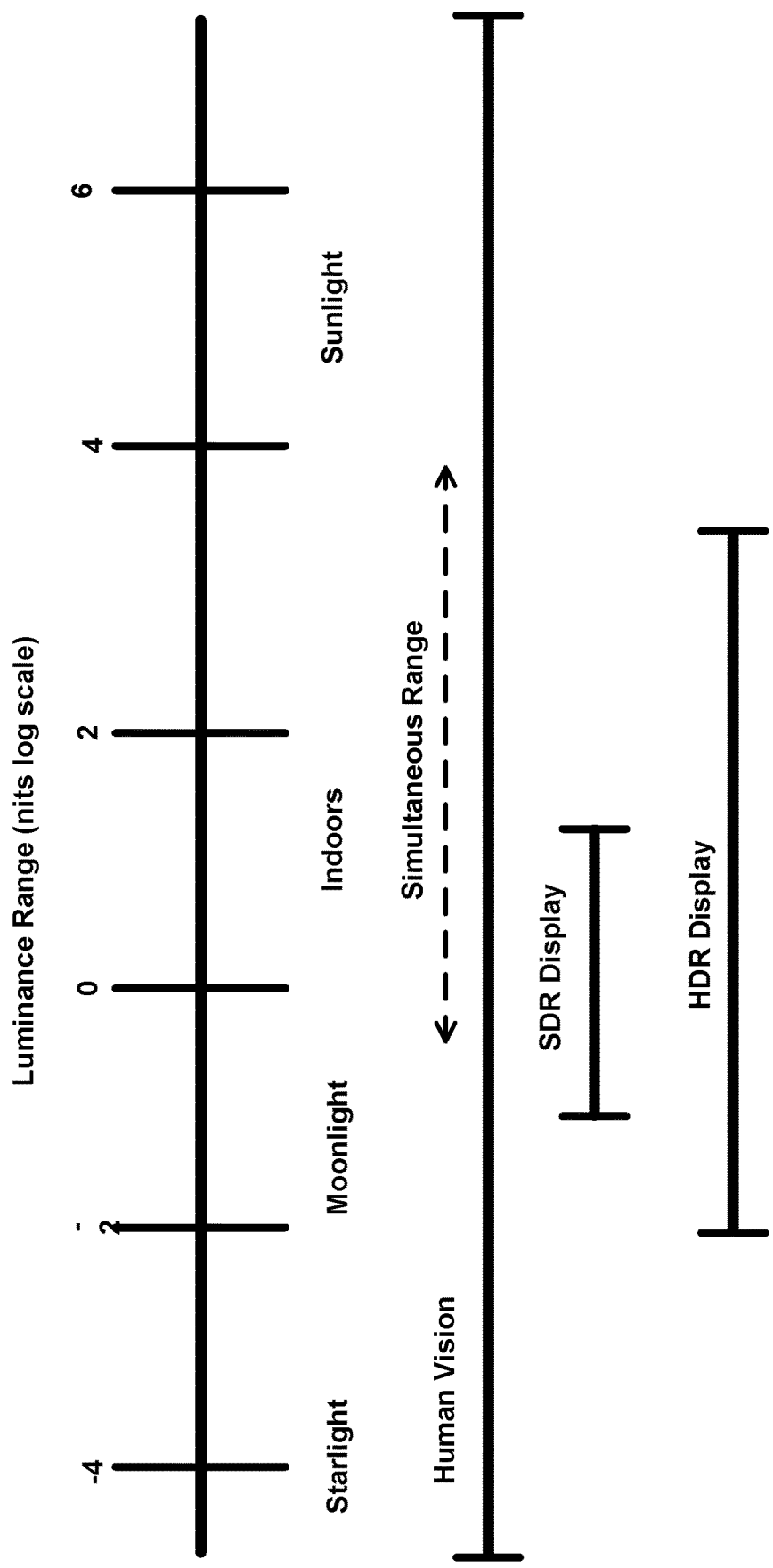
FIG. 3 is a conceptual drawing illustrating the concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). Visualization of dynamic range provided by SDR of HDTV, expected HDR of UHDTV and HVS dynamic range is shown in FIG. 3, although the exact range may vary based on each individual and display.

Some example video applications and services are regulated by ITU Rec.709 and provide SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 4:
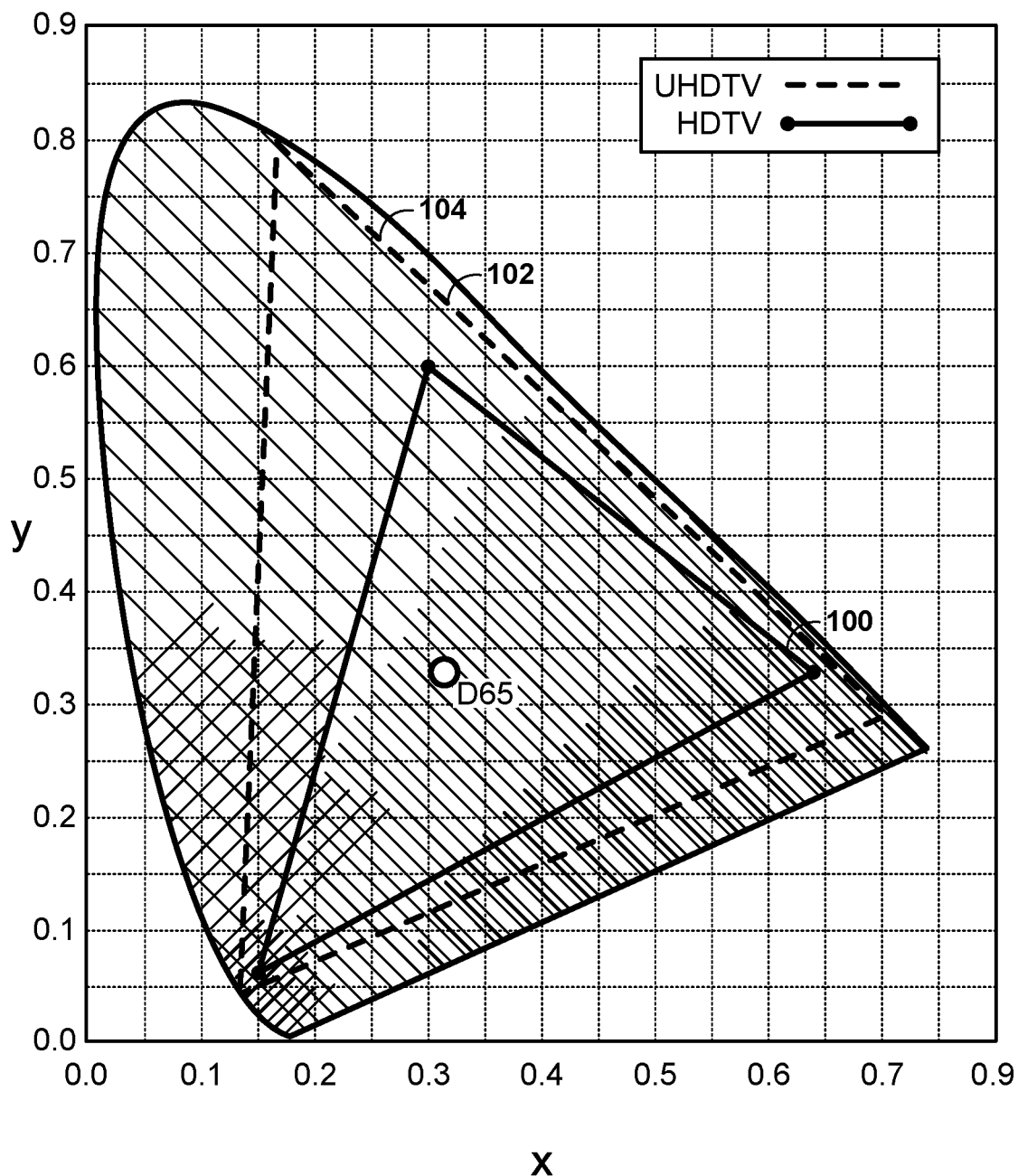
FIG. 4 is a conceptual diagram illustrating example color gamuts.

Another aspect for a more realistic video experience, besides HDR, is the color dimension. Color dimension is typically defined by the color gamut. FIG. 4 is a conceptual diagram showing an SDR color gamut (triangle 100 based on the BT.709 color primaries), and the wider color gamut that for UHDTV (triangle 102 based on the BT.2020 color primaries). FIG. 3 also depicts the so-called spectrum locus (delimited by the tongue-shaped area 104), representing the limits of the natural colors. As illustrated by FIG. 3, moving from BT.709 (triangle 100) to BT.2020 (triangle 102) color primaries aims to provide UHDTV services with about 70% more colors. D65 specifies an example white color for the BT.709 and/or BT.2020 specifications.

Examples of color gamut specifications for the DCI-P3, BT.709, and BT.202 color spaces are shown in Table 1.

TABLE 1

Color gamut parameters
RGB color space parameters

| Color space | White point | | Primary colors | | | | | |
|---|---|---|---|---|---|---|---|---|
| | $x_w$ | $y_w$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the X and Y values of the primary colors (e.g., red (R), green (G), and blue (B). The X and Y values represent the chromaticity (X) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma sub-sampling format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

Figure 5:
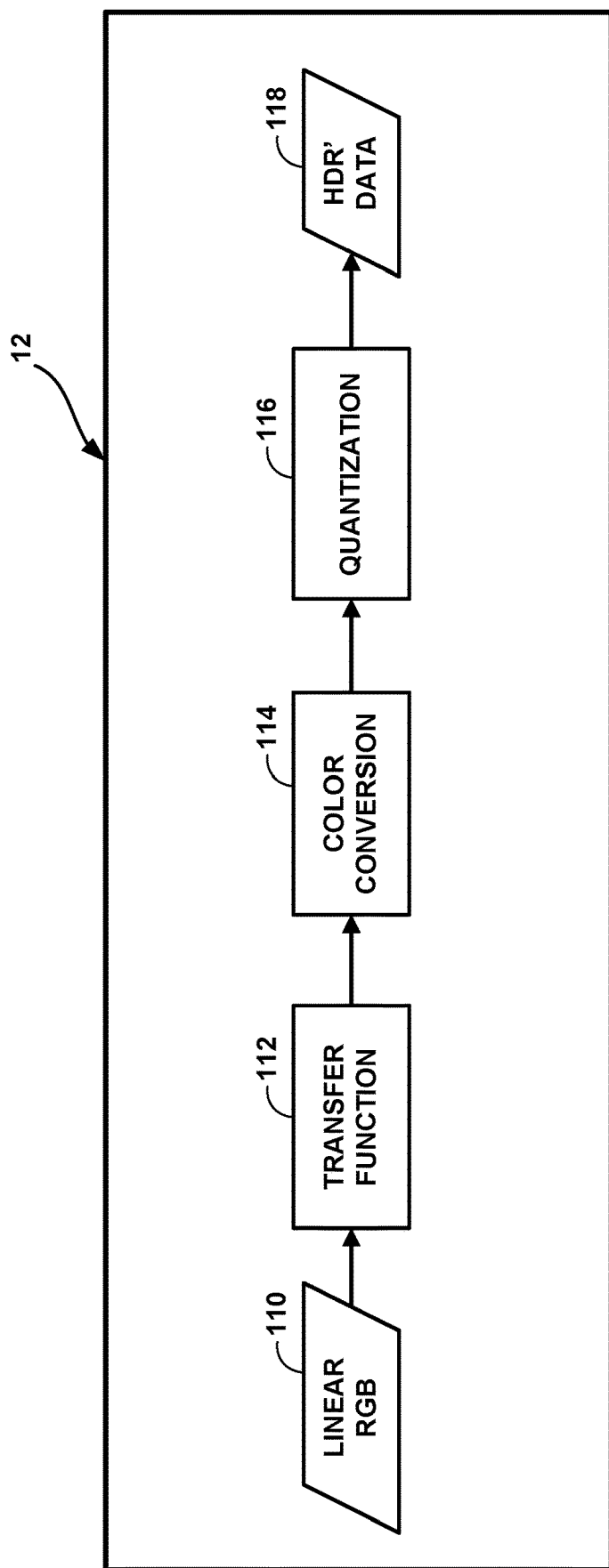
FIG. 5 is a flow diagram illustrating an example of HDR/WCG representation conversion.

One example of a video data format conversion process for purposes of compression includes three major processes, as shown in FIG. 5. The techniques of FIG. 5 may be performed by source device 12. Linear RGB data 110 may be HDR/WCG video data and may be stored in a floating-point representation. Linear RGB data 110 may be compacted using a non-linear transfer function (TF) 112 for dynamic range compacting. Transfer function 112 may compact linear RGB data 110 using any number of non-linear transfer functions, e.g., the PQ TF as defined in SMPTE-2084. In some examples, color conversion process 114 converts the compacted data into a more compact or robust color space (e.g., a YUV or YCrCb color space) that is more suitable for compression by a hybrid video encoder. This data is then quantized using a floating-to-integer representation quantization unit 116 to produce converted HDR' data 118. In this example HDR' data 118 is in an integer representation. The HDR' data is now in a format more suitable for compression by a hybrid video encoder (e.g., video encoder 20 applying HEVC techniques). The order of the processes depicted in FIG. 5 is given as an example, and may vary in other applications. For example, color conversion may precede the TF process. In some examples, additional processing, e.g. spatial subsampling, may be applied to color components.

Figure 6:
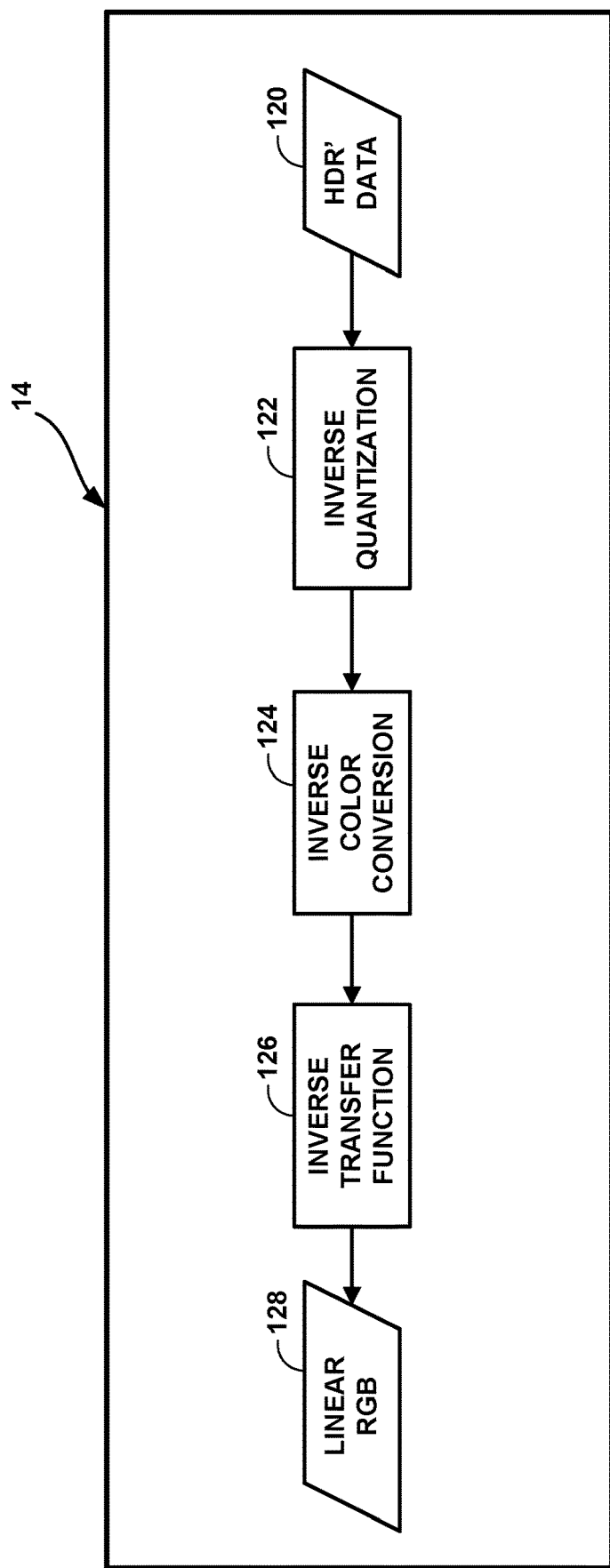
FIG. 6 is a flow diagram illustrating an example of HDR/WCG inverse conversion.

The inverse conversion at the decoder side is depicted in FIG. 6. The techniques of FIG. 6 may be performed by destination device 14. Converted HDR' data 120 may be obtained at destination device 14 through decoding video data using a hybrid video decoder (e.g., video decoder 30 applying HEVC techniques). HDR' data 120 may then be inverse quantized by inverse quantization unit 122. Then an inverse color conversion process 124 may be applied to the inverse quantized HDR' data. The inverse color conversion process 124 may be the inverse of color conversion process 114. For example, the inverse color conversion process 124 may convert the HDR' data from a YCrCb format back to an RGB format. Next, inverse transfer function 126 may be applied to the data to add back the dynamic range that was compacted by transfer function 112 to recreate the linear RGB data 128.

Figure 7:
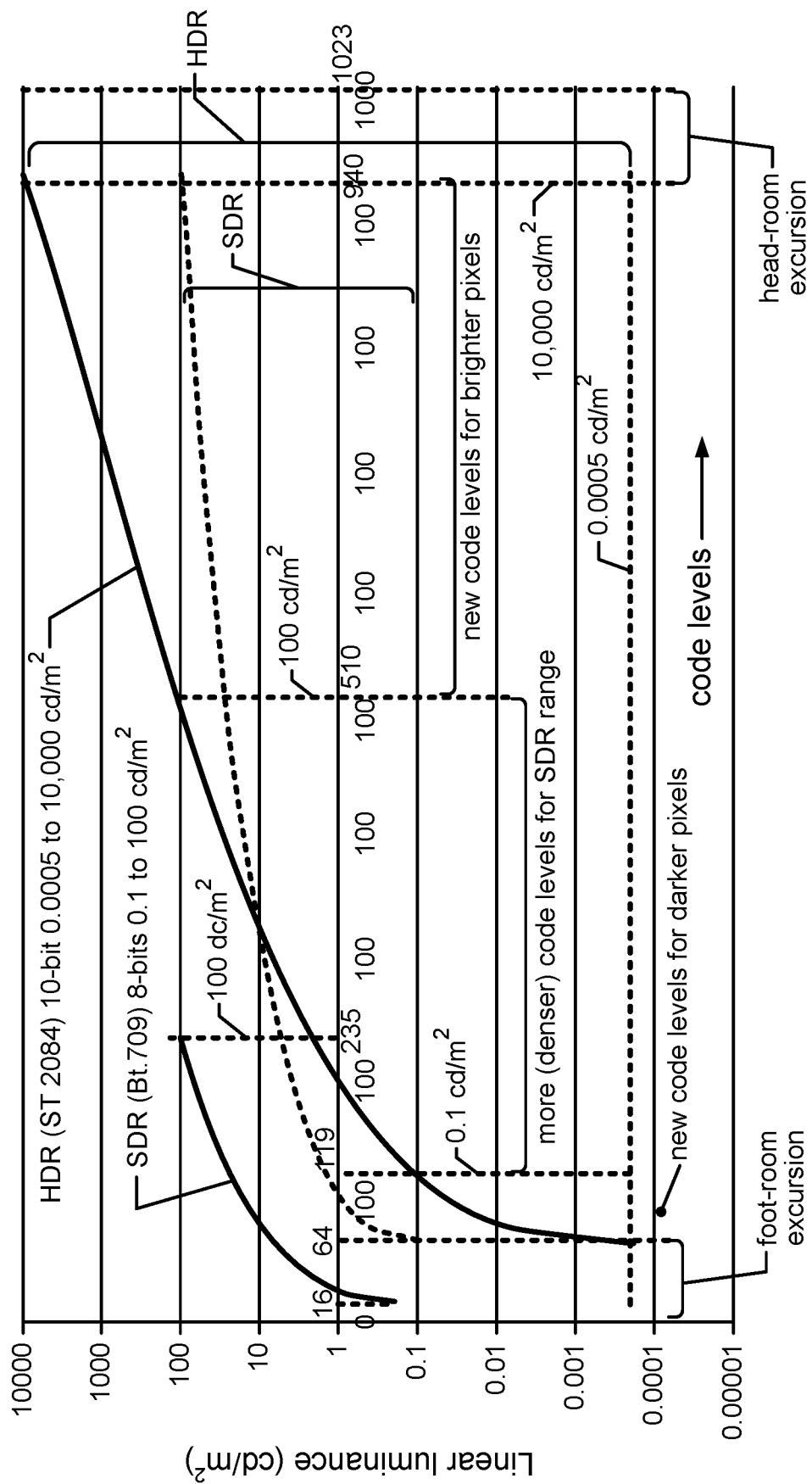
FIG. 7 is conceptual diagram illustrating example of Electro-optical transfer functions (EOTF) utilized for video data conversion (including SDR and HDR) from perceptually uniform code levels to linear luminance.

The techniques depicted in FIG. 5 will now be discussed in more detail. Mapping the digital values appearing in an image container to and from optical energy may involve the use of a "transfer function." In general, a transfer function is applied to data (e.g., HDR/WCG video data) to compact the dynamic range of the data. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in ITU-R BT. 1886 (also defined in Rec. 709). In another example, the transfer function may approximate the HVS perception to brightness changes, e.g., the PQ transfer function specified in SMPTE-2084 for HDR. The inverse process of the OETF is the EOTF (electro-optical transfer function), which maps the code levels back to luminance. FIG. 7 shows several examples of non-linear transfer function used to compact the dynamic range of certain color containers. The transfer functions may also be applied to each R, G and B component separately.

The reference EOTF specified in ITU-R recommendation BT.1886 is defined by the equation:

$$L = a(\max[(V+b), 0])^\gamma$$

where:
L: Screen luminance in cd/m$_2$
$L_W$: Screen luminance for white
$L_B$: Screen luminance for black V: Input video signal level (normalized, black at V=0, to white at V=1. For content mastered per Recommendation ITU-R BT.709, 10-bit digital code values "D" map into values of V per the following equation: V=(D−64)/876

γ: Exponent of power function, γ=2.404 a: Variable for user gain (legacy "contrast" control)

$$a = (L_W^{1/\gamma} - L_B^{1/\gamma})^\gamma$$

b: Variable for user black level lift (legacy "brightness" control)

$$b = \frac{L_B^{1/\gamma}}{L_W^{1/\gamma} - L_B^{1/\gamma}}$$

The above variables a and b are derived by solving the following equations in order that V=1 gives L=$L_W$, and that V=0 gives L=$L_B$:

$$L_B = a \cdot b^\gamma$$

$$L_W = a \cdot (1+b)^\gamma$$

In order to support higher dynamic range data more efficiency, SMPTE has recently standardized a new transfer function called SMPTE ST-2084. Specification of ST2084 defined the EOTF application as following. A TF is applied to normalized linear R, G, B values, which results in a nonlinear representation of R'G'B'. ST-2084 defines normalization by NORM=10000, which is associated with a peak brightness of 10000 nits (cd/m2).

$$R' = PQ\_TF(max(0, min(R/NORM, 1)))$$

$$G' = PQ\_TF(max(0, min(G/NORM, 1)))$$

$$B' = PQ\_TF(max(0, min(B/NORM, 1)))$$

$$\text{with } PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Typically, an EOTF is defined as a function with a floating-point accuracy, thus no error is introduced to a signal with this non-linearity if an inverse TF (so-called OETF) is applied. An inverse TF (OETF) specified in ST-2084 is defined as inversePQ function:

$$R = 10000 * inversePQ\_TF(R')$$

$$G = 10000 * inversePQ\_TF(G')$$

$$B = 10000 * inversePQ\_TF(B')$$

$$\text{with } inversePQ\_TF(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Note, that the EOTF and OETF is a subject of very active research and standardization, and TF utilized in some video coding systems may be different from ST-2084.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

RGB data is typically utilized as the input color space, since RGB is the type of data that is typically produced by image capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different less correlated components. In this context, a robust representation may refer to a color space featuring higher levels of error resilience when compressed at a constrained bitrate.

For modern video coding systems, a typically used color space is YCbCr, as specified in ITU-R BT.709. The YCbCr color space in the BT.709 standard specifies the following conversion process from R'G'B' to Y'CbCr (non-constant luminance representation):

a. $Y' = 0.2126 * R' + 0.7152 * G' + 0.0722 * B'$ b. $Cb = \dfrac{B' - Y'}{1.8556}$ c. $Cr = \dfrac{R' - Y'}{1.5748}$ The above can also be implemented using the following approximate conversion that avoids the division for the Cb and Cr components:

a. $Y' = 0.212600*R' + 0.715200*G' + 0.072200*B'$ b. $Cb = -0.114572*R' - 0.385428*G' + 0.500000*B'$ c. $Cr = 0.500000*R' - 0.454153*G' - 0.045847*B'$

The ITU-R BT.2020 standard specifies the following conversion process from R'G'B' to Y'CbCr (non-constant luminance representation):

a. $Y' = 0.2627 * R' + 0.6780 * G' + 0.0593 * B'$ b. $Cb = \dfrac{B' - Y'}{1.8814}$ c. $Cr = \dfrac{R' - Y'}{1.4746}$ The above can also be implemented using the following approximate conversion that avoids the division for the Cb and Cr components:

$Y' = 0.262700 * R' + 0.678000 * G' + 0.059300 * B'$     a.

$Cb = -0.139630 * R' - 0.360370 * G' + 0.500000 * B'$     b.

$Cr = 0.500000 * R' - 0.459786 * G' - 0.040214 * B'$     c.

Following the color transform, input data in a target color space may be still represented at high bit-depth (e.g. floating-point accuracy). The high bit-depth data may be converted to a target bit-depth, for example, using a quantization process. Certain studies show that 10-12 bits accuracy in combination with the PQ transfer is sufficient to provide HDR data of 16 f-stops with distortion below the Just-Noticeable Difference (JND). In general, a JND is the amount something (e.g., video data) must be changed in order for a difference to be noticeable (e.g., by the HVS). Data represented with 10 bits accuracy can be further coded with most of the state-of-the-art video coding solutions. This quantization is an element of lossy coding and is a source of inaccuracy introduced to converted data.

Example of such quantization applied to code words in target color space (in this example YCbCr) is shown below. Input values YCbCr represented in floating point accuracy are converted into a signal of fixed bit-depth BitDepthY for the Y value and BitDepthC for the chroma values (Cb, Cr).

$D_Y = \text{Clip1}_Y(\text{Round}((1 \ll (\text{BitDepth}_Y - 8)) * (219 * Y' + 16)))$ $D_{Cb} = \text{Clip1}_C(\text{Round}((1 \ll (\text{BitDepth}_C - 8)) * (224 * Cb + 128)))$ $D_{Cr} = \text{Clip1}_C(\text{Round}((1 \ll (\text{BitDepth}_C - 8)) * (224 * Cr + 128)))$ with
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
$\text{Clip1}_Y(x) = \text{Clip3}(0, (1 \ll \text{BitDepth}_Y) - 1, x)$
$\text{Clip1}_C(x) = \text{Clip3}(0, (1 \ll \text{BitDepth}_C) - 1, x)$
Clip3(x,y,z)=x if z<x, y if z>y, z otherwise A rate distortion optimized quantizer (RDOQ) will now be described. Most of the state-of-the-art video coding solutions (e.g., HEVC and the developing VVC) are based on the so-called hybrid video coding scheme, which is basically applying scalar quantization of the transform coefficients resulting from residual signal produced in turn by applying temporal or spatial prediction between currently coded video signal and reference picture(s) available at the decoder side. Scalar quantization applied on the encoder side (e.g., video encoder 20) and inverse scalar dequantization is applied on the decoder side (e.g., video decoder 30). Lossy scalar quantization introduces distortion to the reconstructed signal and requires certain number of bits to deliver quantized transform coefficients as well as coding modes description to the decoder side.

During the evolution of video compression techniques, a number of approaches targeting the improvement of quantized coefficient calculation has been developed. One approach is Rate Distortion Optimized Quantization (RDOQ), which is based on rough estimation of the RD cost of modification or removal of selected transform coefficient or transform coefficients group. The purpose of RDOQ is to find the optimal or most optimal set of quantized transform coefficients representing a residual data in an encoded block. The RDOQ calculates the image distortion (introduced by quantization of transform coefficients) in an encoded block and a number of bits needed to encode the corresponding quantized transform coefficient. Based on these two values, the encoder chooses a better coefficient value by calculating RD cost.

The RDOQ in the encoder may include 3 stages: quantization of transform coefficients, elimination of coefficient groups (CG), and selection of the last non-zero coefficient. In the first stage, the video encoder performs produce transform coefficients by uniform quantizer without dead zone, which results in Level value calculation for the current transform coefficient. Following this, the video encoder considers two additional magnitudes of this quantized coefficient: Level-1 and 0. For every one of these 3 options {Level, Level-1, 0}, the video encoder calculates the RD cost of encoding the coefficient with the selected magnitude and chooses the one with the lowest RD cost. In addition, some RDOQ implementations may consider nullifying a transform coefficient group entirely, or reducing the size of the signaled transform coefficient group by reducing the position of the last signaled coefficient for each of the groups. At the decoder side, inverse scalar quantization is applied to quantized transform coefficients derived from the syntax elements of the bitstream.

Some of the existing transfer functions and color transforms used in video coding may result in a video data representation that features significant variation of Just-Noticeable Difference (JND) threshold values over the dynamic range of the signal representation. That is, some ranges of codeword values for luma and/or chroma components may have different JND threshold values than other ranges of codeword values for the luma and/or chroma components. For such representations, a quantization scheme that is uniform over the dynamic range of luma values (e.g., uniform over all codeword values for luma) would introduce quantization error with different merit of human perception over the signal fragments (partitions of the dynamic range). Such impact on signals may be interpreted by a viewer as a processing system with a non-uniform quantization, which results in unequal signal-to-noise ratios within processed data range.

Examples of such representation is a video signal represented in Non Constant Luminance (NCL) YCbCr color space whose color primaries are defined in ITU-R Rec. BT.2020 and with the ST-2084 transfer function. As illustrated in Table 2, NCL YCbCR color spaces allocates a significantly larger amount of codewords for the low intensity values of the signal, e.g., 30% of codewords represent linear light samples <10 nits, whereas high intensity samples (high brightness) are represented with a much smaller amount of codewords, e.g., 25% of codewords are allocated for linear light in the range 1000-10000 nits. As a result, a video coding system, e.g., H.265/HEVC, featuring uniform quantization for all ranges of the data would introduce much more severe coding artifacts to the high intensity samples (bright region of the signal), where distortion introduced to low intensity samples (dark region of the same signal) would be far below noticeable difference.

TABLE 2

Relation between linear light intensity and code value in SMPTE ST 2084 (bit depth = 10)

| Linear light intensity (cd/m²) | Full range | SDI range | Narrow range |
|---|---|---|---|
| ~0.01 | 21 | 25 | 83 |
| ~0.1 | 64 | 67 | 119 |
| ~1 | 153 | 156 | 195 |
| ~10 | 307 | 308 | 327 |
| ~100 | 520 | 520 | 509 |
| ~1,000 | 769 | 767 | 723 |
| ~4,000 | 923 | 920 | 855 |
| ~10,000 | 1023 | 1019 | 940 |

Effectively, this means that video coding system design, or encoding algorithms may benefit from adjustment for every selected video data representation, namely for every selected transfer function and color space. Previously, the following methods have been proposed to address the problems with non-optimal perceptual quality codeword distribution described above.

In "Dynamic Range Adjustment SEI to enable High Dynamic Range video coding with Backward-Compatible Capability," D. Rusanovskyy, A. K. Ramasubramonian, D. Bugdayci, S. Lee, J. Sole, M. Karczewicz, VCEG document COM16-C 1027-E, September 2015, the authors proposed to apply a codewords re-distribution to video data prior to video coding. Video data in the ST-2084/BT.2020 representation undergoes a codeword re-distribution prior to the video compression. The re-distribution introduces linearization of perceived distortion (signal-to-noise ratio) within a dynamic range of the data through a Dynamical Range Adjustment. This redistribution was found to improve visual quality under the bitrate constrains. To compensate the redistribution and convert data to the original ST 2084/BT.2020 representation, an inverse process is applied to the data after video decoding.

One of the drawbacks of this approach is the fact that the pre-processing and post-processing are generally de-coupled from rate distortion optimization processing employed by state-of-the-art encoders on a block-based basis. Therefore, the technique described in VCEG document COM16-C 1027-E does not employ information available to the decoder, such as target frame rate of quantization distortion introduced by quantization scheme of video codec.

In "Performance investigation of high dynamic range and wide color gamut video coding techniques," J. Zhao, S.-H. Kim, A. Segall, K. Misra, VCEG document COM16-C 1030-E, September 2015, an intensity dependent spatially varying (block-based) quantization scheme was proposed to align bitrate allocation and visually perceived distortion between video coding applied on $Y_{2020}$ (ST2084/BT2020) and $Y_{709}$ (BT1886/BT 2020) representations. It was observed that to maintain the same level of quantization in luma components, the quantization of signal in $Y_{2020}$ and $Y_{709}$ differs by a value that depends on luma, such that:

$$QP\_Y_{2020} = QP\_Y_{709} - f(Y_{2020})$$

The function $f(Y_{2020})$ was found to be linear for intensity values (brightness level) of video in $Y_{2020}$, and it may be approximated as:

$$f(Y_{2020}) = \max(0.03 * Y_{2020} - 3, 0)$$

The proposed spatially varying quantization scheme being introduced at the encoding stage was found to be able to improve visually perceived signal-to-quantization noise ratio for coded video signal in ST 2084/BT.2020 representation.

One of the drawback of this approach is a block-based granularity of QP adaptation. Typically utilized block sizes selected at the encoder side for compression are derived through a rate distortion optimization process, and may not represent dynamic range properties of the video signal, thus the selected QP settings will be sub-optimal for the signal inside of the block. This problem may become even more important for the next generation video coding systems that tend to employ prediction and transform block sizes of larger dimensions. Another aspect of this design is a need for signaling of QP adaptation parameters to the decoder side for inverse dequantization. Additionally, spatial adaptation of quantization parameters at the encoder side increases the complexity of encoding optimization and may interfere with rate control algorithms.

In "Intensity dependent spatial quantization with application in HEVC," Matteo Naccari and Marta Mrak, In Proc. of IEEE ICME 2013, July 2013, an Intensity Dependent Spatial Quantization (IDSQ) perceptual mechanism was proposed. IDSQ exploits the intensity masking of the human visual system and perceptually adjusts quantization of the signal at the block level. The authors of this paper propose to employ in-loop pixel domain scaling. Parameters of in-loop scaling for a currently processed block are derived from average values of luma component in the predicted block. At the decoder side, the inverse scaling is performed, and decoder derives parameters of scaling from predicted block available at the decoder side.

Similarly to techniques in "Performance investigation of high dynamic range and wide color gamut video coding techniques," a block-based granularity of this approach restricts the performance of this method due to a sub-optimal scaling parameter, which is applied to all samples of the processed block. Another aspect of the proposed solution is that the scale value is derived from predicted block and does not reflect signal fluctuation which may happen between current codec block and predicted.

"De-quantization and scaling for next generation containers," J. Zhao, A. Segall, S.-H. Kim, K. Misra (Sharp), JVET document B0054, January 2016, addresses a problem of non-uniform perceived distortion in the ST.2084/BT.2020 representations. The authors proposed to employ in-loop intensity dependent block-based transform domain scaling. Parameters of in-loop scaling for selected transform coefficients (AC coefficients) of the currently processed block are derived as a function of average values of luma components in the predicted block and a DC value derived for the current block. At the decoder side, the inverse scaling is performed, and the decoder derives parameters of AC coefficient scaling from the predicted block available at the decoder side and from a quantized DC value which is signalled to the decoder.

Similar to techniques in "Performance investigation of high dynamic range and wide color gamut video coding techniques" and "Intensity dependent spatial quantization with application in HEVC," a block-based granularity of this approach restricts the performance of this method due sub-optimality of scaling parameter which is applied to all samples of the processed block. Another aspect of the proposed solution is that the scale value is applied to AC transform coefficients only. Therefore, signal-to-noise ratio improvement does not affect the DC value, which reduces the performance of the scheme. In addition, in some video coding system designs, the quantized DC value may not be available at the time of AC value scaling, e.g., in the case when a quantization process is following a cascade of transform operations. Another restriction of this proposal is that when the encoder selects the transform skip or transform/quantization bypass modes for the current block, scaling is not applied (hence, in the decoder scaling is not defined for transform skip and transform/quantization bypass modes), which is sub-optimal due to exclusion of potential coding gain for these two modes.

In U.S. patent application Ser. No. 15/595,793, filed May 15, 2017, in-loop sample processing for video signals with non-uniformly distributed JD was described. This patent application describes the application of scale and offset of signal samples represented either in pixel, residual or transform domain. Several algorithms for derivation of the scale and offset were proposed.

This disclosure describes several video coding and processing techniques that may be applied in the video coding loop (e.g., during the video encoding and/or decoding process and not in pre- or post-processing) of a video coding system. The techniques of this disclosure include encoder side (e.g., video encoder 20) algorithms with content-adaptive spatially varying quantization without explicit signaling of quantization parameters (e.g., a change in a quantization parameter represented by a deltaQP syntax element) to more efficiently compress HDR/WCG video signals. The techniques of this disclosure also include decoder side (e.g., video decoder 30) operations which improve performance of video decoding tools that use quantization parameters information. Examples of such decoding tools can include deblocking filters, bilateral filters, adaptive loop filters, or other video coding tools that use quantization information as an input.

Video encoder 20 and/or video decoder 30 may be configured to perform one or more of the following techniques independently, or in any combination with others.

In one example of the disclosure, video encoder 20 may be configured to perform a multi-stage quantization process for each block of video data in a picture of video data. The techniques described below may be applied to both luma and chroma components of the video data. Video decoder may be configured to perform quantization using a base quantization parameter (QPb) value. That is, the QPb value is applied uniformly across all blocks. For a given base quantization parameter (QPb) value provided to transform quantization to be applied to the samples s(Cb) of the coded block Cb, video encoder 20 may further be configured to utilize a content-dependent QP offset as a deviation from the QPb value. That is, for each block of video data, or for a group of blocks of video data, video encoder 20 may further determine a QP offset that is based on the content of the block of groups of blocks.

In this way, video encoder 20 may account for a rate distortion optimized (RDO) selection of a quantization level LevelX, which is produced by an effectively different quantization parameter (QPe). In this disclosure, QPe may be referred to as an effective quantization parameter. QPe is the QP offset (deltaQP) plus the base QPb value. Video encoder 20 may derive QPe for a current block Cb using the following equation:

$$QPe(Cb)=QPb(Cb)+\text{delta}QP(s(Cb)), \text{ with delta}QP>0) \quad (1)$$

where the deltaQP(Cb) variable is derived from local properties (e.g., statistics) of the coded block Cb. For example, video encoder 20 may be configured to derive the value of deltaQP for block Cb using a function of the average of the sample values (e.g., luma or chroma values) of the block Cb. In other examples, video encoder 20 may use other functions of the sample values of block Cb to determine the value of deltaQP. For example, video encoder 20 may determine the value of deltaQP using a second order operation (e.g., variance) on the sample values of block Cb. As another example, video encoder 20 may determine the value of deltaQP using a function of the sample values of block Cb and values of one or more samples of neighboring blocks. As will be explained in more detail below, video encoder 20 may be configured to quantize residual values of block Cb with both the QPb value and the QPe value. As a result, the residual data r(Cb) derived for currently coded block Cb is coded with quantization parameter QPb. However, the distortion introduced to the residual is first produced with quantization parameter QPe, resulting in transform quantization coefficients tq(Cb). Since QPe may vary from block to block, video encoder 20 may adjust for the varying JND threshold present in some color representations, and provide for a non-uniform quantization.

At video decoder 30, quantized transform coefficients tq(Cb) undergo inverse quantization with base quantization parameter QPb. Video decoder 30 may derive the base quantization parameter QPb from a syntax element that is associated with the current block Cb. Video decoder 30 may receive the syntax element in an encoded video bitstream. Video decoder 30 may then perform one or more inverse transforms on the inverse quantized transform coefficients to create decoded residual. Video decoder 30 may then perform a prediction process (e.g., inter prediction or intra prediction) to produce decoded samples d(Cb) for current block Cb.

Note that video decoder 30 does not use effective quantization parameter QPe when reconstructing residual values for the block. As such, the distortion introduced by video encoder 20 when applying QPe during encoding remains in the residuals, thus improving uneven JND threshold issues with certain color spaces, as discussed above. However, considering that the residual signal features the distortion introduced by quantization parameter QPe, which is larger than QPb value which is communicated in bitstream and associated with current Cb, other decoding tools (e.g., in-loop filtering, entropy decoding, etc.) that rely on QP parameters provided by the bitstream for attenuating its operation may be adjusted to improve their performance. This adjustment is done by providing the coding tools under consideration with an estimate of the actual QPe which was applied by video encoder 20 to the Cb. As will be explained in more detail below, video decoder 30 may be configured to derive an estimate of the effective quantization parameter QPe from statistics of the decoded samples d(Cb) and other parameters of bitstream. In this way, bit overhead is saved, as block-by-block values of QPe are not signaled in the bitstream.

The following sections provide non-limiting examples of implementations of the techniques of this disclosure. Initially, examples of a structure for video encoder 20 an encoder-side algorithm will be described.

Figure 8:
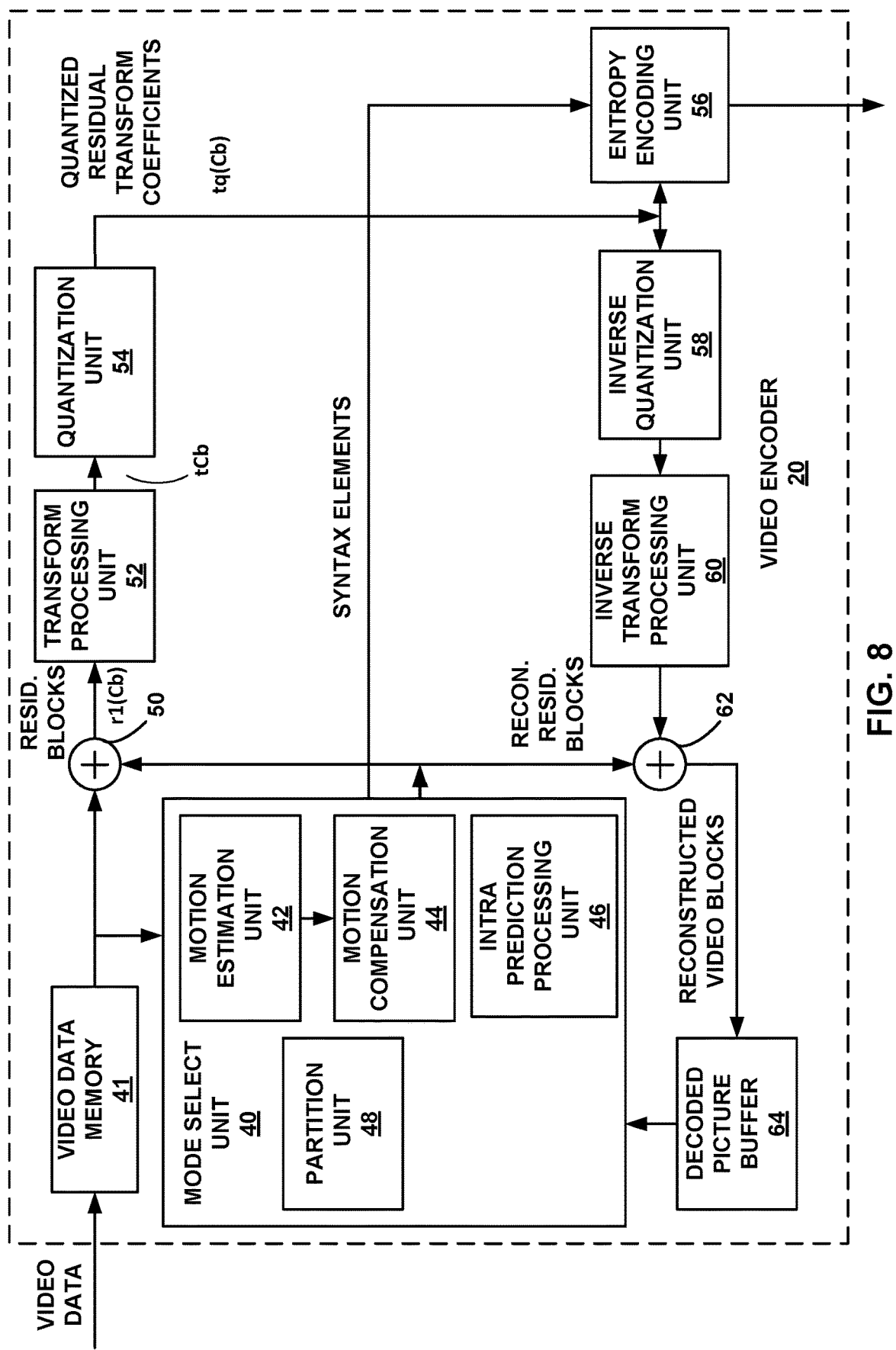
FIG. 8 is a block diagram illustrating an example of a video encoder that may implement techniques of this disclosure.

FIG. 8 is a block diagram illustrating an example of video encoder 20 that may implement the techniques of this disclosure. As shown in FIG. 8, video encoder 20 receives a current video block of video data within a video frame to be encoded. In accordance with the techniques of this disclosure the video data received by video encoder 20 may HDR and/or WCG video data. In the example of FIG. 8, video encoder 20 includes mode select unit 40, video data memory 41, DPB 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 8) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs. In other examples, partition unit 48 may partition the input video data according to a QTBT partitioning structure.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block (e.g., r1(Cb) for current block Cb) by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients tCb to quantization unit 54.

As described above, video encoder 20 may produce residual signal r(Cb) of currently coded block Cb from samples of currently coded block s(Cb) and predicted samples p(Cb) (e.g., predicted samples from inter-prediction or intra-prediction). Video encoder 20 may perform one or more forward transforms on residual r(Cb) which results in transform coefficients t(Cb). Video encoder 20 may then quantize the transform coefficients t(Cb) prior to entropy encoding. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Figure 9:
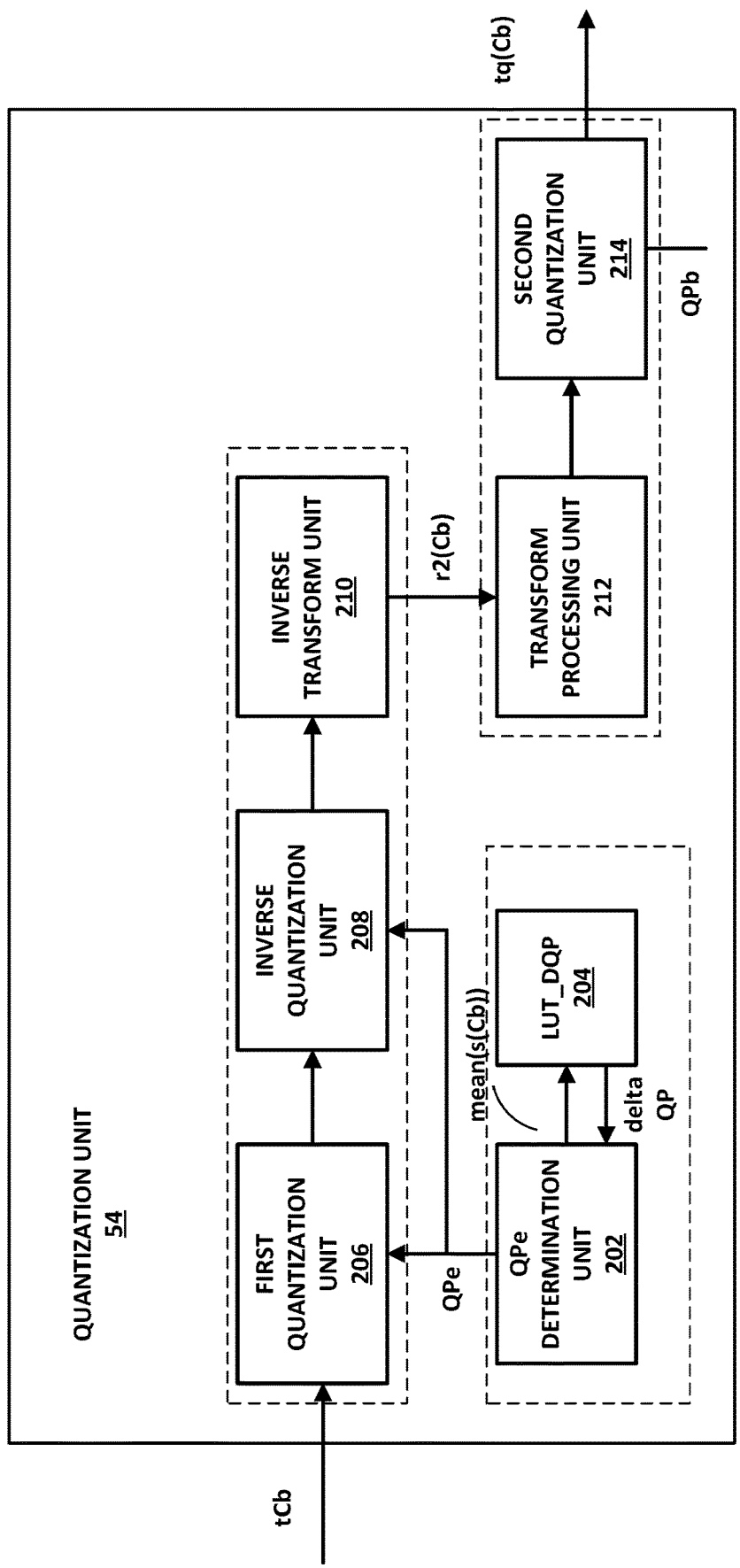
FIG. 9 is a block diagram illustrating an example quantization unit of a video encoder that may implement techniques of this disclosure

In accordance with the techniques of this disclosure, quantization unit 54 may be configured to perform a multistage quantization process on transform coefficients t(Cb). FIG. 9 is a block diagram illustrating an example quantization unit of a video encoder that may implement techniques of this disclosure As shown in FIG. 9, at a first stage, QPe determination unit 202 may be configured to derive a quantization parameter offset (deltaQP(s(Cb)) for the current block Cb. In one example, QPe determination unit 202 may be configured derive deltaQP(s(Cb) from a lookup table (e.g., LUT_DQP 204). LUT_DQP 204 includes the deltaQP values and is accessed by an index derived from the average of s(Cb) samples (e.g., luma or chroma samples) of block Cb. The equation below shows one example of deriving a quantization parameter offset:

$$\text{delta}QP(s(Cb))=LUT\_DQP(\text{mean}(s(Cb))) \quad (2)$$

where LUT_DQP is the lookup table for deltaQP(s(Cb)) and mean(s(Cb)) is the average of the sample values of the block Cb.

In other examples, QPe determination unit 202 may be configured to derive the value of deltaQP(s(Cb)) by a function (e.g., a second order function based on variance) of some other characteristic of the samples of the coded block, or characteristics of the bitstream. QPe determination unit 202 may be configured to determine the deltaQP value using an algorithm, lookup table, or may explicitly derive the deltaQP value using other means. In some examples, the samples used to determine deltaQP( ) may include both luma and chroma samples, or more generally samples of one or more components of the coded block.

QPe determination unit 202 may then use the variable deltaQP(Cb) to derive the effective quantization parameter QPe, as shown in Equation (1) above. QPe determination unit 202 may then provide the QPe value to first quantization unit 206 and inverse quantization unit 208. At a second stage, first quantization unit 206 performs a forward quantization on transform coefficients t(Cb) using the derived QPe value. Then, inverse quantization unit 208 inversely quantizes the quantized transform coefficients using the QPe value and inverse transform unit 210 performs an inverse transformation (e.g., the inverse transform of transform processing unit 52). This results in residual block r2(Cb) with introduced distortions of QPE. An equation for the second stage of the process is shown below:

$$r2(Cb)=\text{InverseTrans}(\text{InverseQuant}(QPe,\text{ForwardQuant}(QPe,t(Cb)))) \quad (3)$$

where InverseTrans is an inverse transformation process, InverseQuant is an inverse quantization process, and ForwardQuant is a forward quantization process.

At a third stage, transform processing unit 212 performs one or more forward transforms (e.g., the same as transform processing unit 52) on residual r2(Cb). Then second quantization unit 214 performs a forward quantization on the transformed residual using the base quantization parameter QPb. This results in quantized transform coefficients tq(Cb), as shown in the equation below:

$$tq(Cb)=\text{ForwardQuant}(QPb,\text{ForwardTrans}(r2(Cb))) \quad (4)$$

where ForwardTrans is a forward transformation process.

Returning to FIG. 8, following quantization, entropy encoding unit 56 entropy codes the quantized transform coefficients tq(Cb). For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Example embodiments of decoder side processing will now be described. At the decoder side, certain coding tools are dependent on the quantization parameter associated with QP value utilized for coding current block, or group of blocks. Some non-limiting examples may include: deblocking filters, bilateral filters, loop filter filters, interpolation filters, entropy codec initialization, or others.

Figure 10:
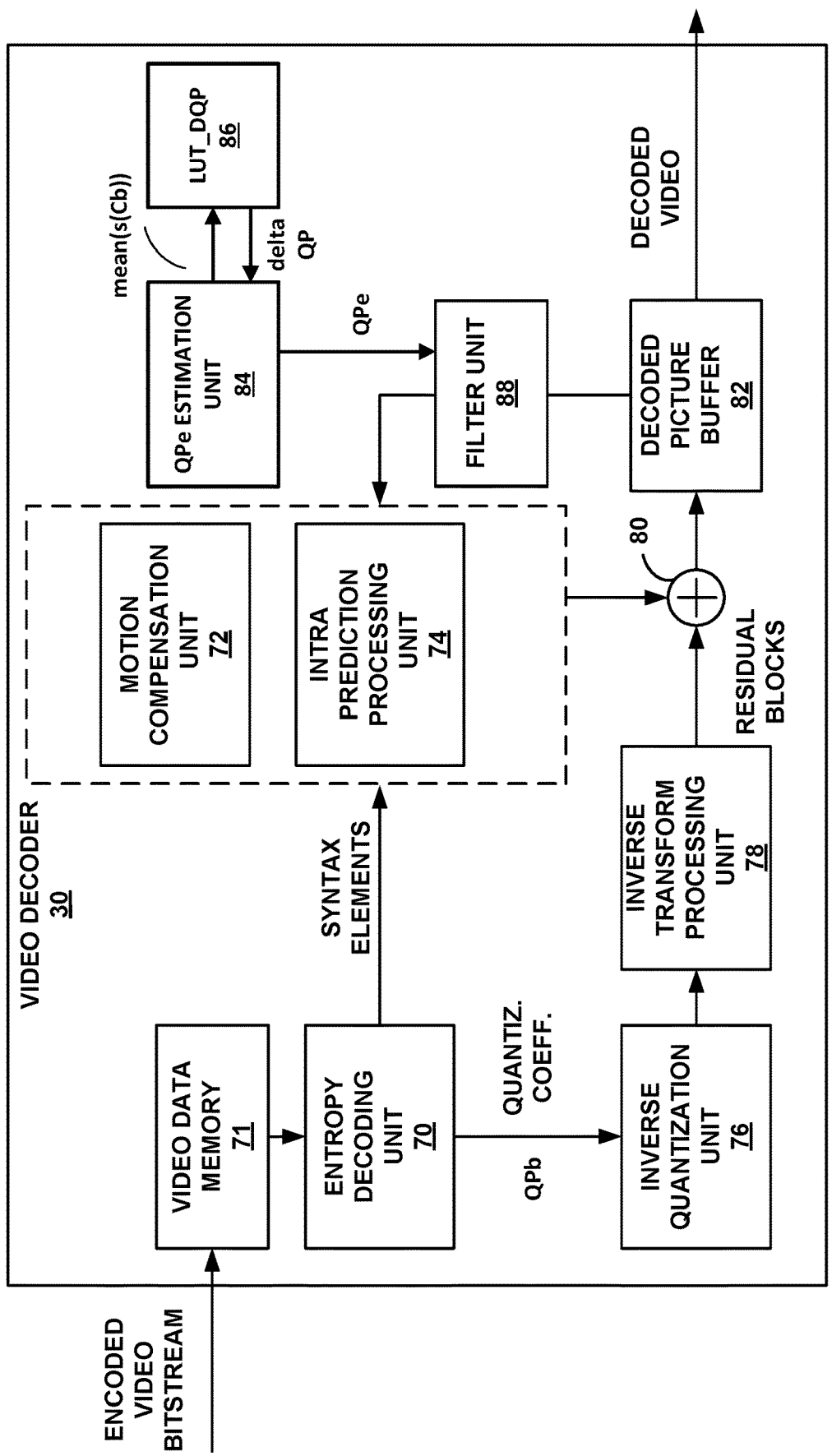
FIG. 10 is a block diagram illustrating an example of a video decoder that may implement techniques of this disclosure.

FIG. 10 is a block diagram illustrating an example of video decoder 30 that may implement the techniques of this disclosure. In the example of FIG. 10, video decoder 30 includes an entropy decoding unit 70, video data memory 71, motion compensation unit 72, intra prediction processing unit 74, inverse quantization unit 76, inverse transform processing unit 78, decoded picture buffer 82, summer 80, QPe estimation unit 84, LUT_DQP 86, and filter unit 88. Video decoder 30 may, in some examples, perform a decoding pass generally reciprocal to the encoding pass described with respect to video encoder 20 (FIG. 8). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as DRAM, including SDRAM, MRAM, RRAM, or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. The encoded video bitstream may have been encoded by video encoder 20 using the multi-stage quantization process described above. The encoded video bitstream may also represent video data defined by an HDR and/or WCG color format. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. In some examples, entropy decoding unit 70 may decode a syntax element that indicates a base quantization parameter QPb for the blocks of video data to be decoded. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a base quantization parameter QPb determine by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation.

Filter unit 88 may be configured to apply one or more filtering operations to the decoded video data before output and storage in decoded picture buffer 82. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1. Example filters that may be applied by filter unit 88 include deblocking filter, bilateral filters, adaptive loop filters, sample adaptive offset filters, and others. For example, if desired, a deblocking filter may be applied to filter the decoded blocks in order to remove blockiness artifacts. Other loop filters (either in the coding loop or after the coding loop) may also be used to smooth pixel transitions, or otherwise improve the video quality. Decoded picture buffer 82 also stores decoded video for later presentation on a display device, such as display device 32 of FIG. 1.

In some examples, the parameters of a filter applied by filter unit 88 may be based on a quantization parameter. As described above, the video data received by video decoder 30 includes distortion introduced by video encoder 20 using effective quantization parameter QPe, which is larger than QPb value which is communicated in bitstream and associated with current Cb. Filters applied by filter unit 88 may rely on QP parameters provided by the bitstream to adjustment performance. Accordingly, video decoder 30 may be configured to derive an estimate of the actual QPe which was applied by video encoder 20 to the Cb. In this regard, video decoder 30 may include QPe estimation unit 84 to derive the value of QPe.

For example, QPe estimation unit 84 may be configured to estimate a quantization parameter offset (deltaQP(s(Cb)) for the current block Cb. In one example, QPe estimation unit 84 may be configured estimate deltaQP(s(Cb)) from a lookup table (e.g., LUT_DQP 86). LUT_DQP 86 includes estimates of deltaQP values and is accessed by an index derived from the average of decoded s(Cb) samples (e.g., luma or chroma samples) of block Cb. The equation below shows one example of deriving a quantization parameter offset:

$$\text{delta}QP(s(Cb))=LUT\_DQP(\text{mean}(s(Cb))) \quad (2)$$

where LUT_DQP is the lookup table for deltaQP(s(Cb)) and mean(s(Cb)) is the average of the decoded sample values of the block Cb.

In other examples, QPe estimation unit 84 may be configured to estimate the value of deltaQP(s(Cb)) by a function (e.g., a second order function based on variance) of some other characteristic of the samples of the coded block, or characteristics of the bitstream. QPe estimation unit 84 may be configured to estimate the deltaQP value using an algorithm, lookup table, or may explicitly estimate the deltaQP value using other means. In some examples, the samples used to determine deltaQP( ) may include both luma and chroma samples, or more generally samples of one or more components of the decoded block. QPe estimation unit 84 may then provide the estimated value of QPe to filter unit 88 for use by one or more coding tools implemented by filter unit 88.

In one example, filter 88 may be configured to perform deblocking filtering. In one non-limiting example of a deblocking implementation, the process of deblocking is given below as a change of the HEVC specification for deblocking filtering. Introduced changes are marked in double underlines:

8.7.2.5.3 Decision Process for Luma Block Edges

The variables QpQ and QpP are set equal to the QpY_EQ QpY_EP values of the coding units Cbq and Cbp which include the processing blocks containing the sample q0,0 and p0,0, respectively. The QpY_EQ and QpY_EP is derived as follows:

$$QpY\_EQ = QpY + \text{delta}QP(s(Cbq))$$

$$QpY\_EP = QpY + \text{delta}QP(s(Cbp)) \quad (5)$$

With deltaQP(s(Cb)) variable offset is derived Look Up Table consisting the deltaQP values and accessed by index derived from averaging s(Cb) samples.

$$\text{delta}QP(d(Cbq)) = LUT\_DQP(\text{mean}(d(Cbq)))$$

$$\text{delta}QP(d(Cbq)) = LUT\_DQP(\text{mean}(d(Cbp))) \quad (6)$$

A variable qPL is derived as follows:

$$qPL = ((QpQ + Qpp + 1) >> 1)$$

8.7.2.5.5 Filtering Process for Chroma Block Edges

The variables QpQ and QpP are set equal to the QpY_EQ QpY_EP values of the coding units which include the coding blocks containing the sample q0,0 and p0,0, respectively. The QpY_EQ and QpY_EP is derived as follows:

$$QpY\_EQ = QpY + \text{delta}QP(s(Cbq))$$

$$QpY\_EP = QpY + \text{delta}QP(s(Cbp)) \quad (7)$$

With deltaQP(s(Cb)) variable offset is derived Look Up Table consisting the deltaQP values and accessed by index derived from averaging s(Cb) samples.

$$\text{delta}QP(d(Cbq)) = LUT\_DQP(\text{mean}(d(CbqY)), \text{mean}(d(CbqC)), \text{alpha})$$

$$\text{delta}QP(d(Cbq)) = LUT\_DQP(\text{mean}(d(CbpY)), \text{mean}(d(CbpC)), \text{alpha}) \quad (9)$$

where d(CbqY) and d(CbpY) are decoded Luma block samples associated with chroma samples q0,0 and p0,0, belonging to d(CbqC) and d(CbpC) respectively. The alpha is a parameter specifying specific LUT_DQP utilized for current Cb. Alpha variable can be derived from syntax elements of coded bitstream, index of the current chroma component, spatio-temporal neighborhood, or from decoded picture samples.

If ChromaArrayType is equal to 1, the variable QpC is determined as specified in Table 8-10 based on the index qPi derived as follows:

$$qPi = ((QpQ + QpP + 1) >> 1) + cQp\text{PicOffset}$$

In the example above, QpY is the same as QPb and QpY_EQ is the same QPe.

In another example, filter unit 88 may be configured to implement a bilateral filter. The bilateral filter modifies a sample based on a weighted average of the samples in its neighbourhood, and the weights are derived based on the distance of the neighboring samples from the current sample and the difference in the sample values of the current sample and the neighbouring samples.

Let x be the location of a current sample value that is filtered, based on samples in its neighbourhood N(x). For each sample d(y) for y belonging to N(x), let w(y,x) be the weight associated with sample at location y to obtain the filtered version of sample at x. The filtered version of x, D(x) is obtained as $$D(x)=\Sigma_{y\in N(x)}w(y,x)d(y) \quad (8)$$

The weights are derived as $$w(y,x)=f(y,x,d(y),d(x),QP(Cb)) \quad (9)$$

Where f( ) is the function that calculates the weights based on the sample locations and the sample values. The QP used to code the block containing the samples may also be an additional argument in the derivation of f( ). In some examples, the QP value of the block containing x is used as the argument to f( ). In this example, the QP value used as an additional argument in f( ) is QPd(Cb), which is derived as follows:

$$QPe(Cb)=QP(Cb)+\text{delta}QP(d(Cb)) \quad (10)$$

Where QP(Cb) is the signalled QP value (e.g., QPb) for the coded block, and deltaQP(d(Cb)) is the QP values obtained based on characteristics of the decoded coded block, e.g. mean. Thus, the derived weights are as follows:

$$w(y,x)=f(y,x,d(y),d(x),QPe(Cb)) \quad (11)$$

In some example, the weighing functions are derived separately for luma and chroma. The QP associated with the chroma coded blocks may also have the effect of chroma offset that are derived or signalled in the bitstream, and the deltaQP( ) derived may be the function of samples one or more components.

In some example, the QP used as an additional argument for f( ) may be obtained by taking in to account the QPe( ) value derived for coded block containing the sample at position x, and the QPe( ) value derived for the coded block containing the sample at position y. For example, a valued derived from the two QPd( ) values, e.g. average, may be chosen as the argument for f( ).

In another example of the disclosure, video decoder 30 may be configured to use multiples LUT_DQP. In some examples, two or more LUT_DQP tables can be available at video decoder 30. Video decoder 30 may be configured to derive an index of a particular one of the two or more lookup tables to be used for a particular block edge are derived. Video decoder 30 may be configured to derive the index from syntax elements, from coding information from blocks in the same spatio-temporal neighborhood of the current, or from statistics of decoded picture samples.

For example:

$$\text{delta}QP(d(Cbq))=LUT\_DQP(d(Cbq),Idx1)$$

$$\text{delta}QP(d(Cbq))=LUT\_DQP(d(Cbp),Idx2) \quad (12)$$

where Idx1 and Idx2 are index selection out of several LUT_DQP tables available at video decoder 30.

In another example of the disclosure, video encoder 20 and video decoder 30 may be configured to apply spatially varying quantization with finer block granularaitie. In some example, video encoder 20 may be configured to split a currently coded block Cb into sub partitions, each of which is processed independently according to equations 2, 3 and 4 above. Once reconstructed signal r2 is produced for each of the partitions, they form r2(Cb) data which further is processed as shown in equation (5) above.

At video decoder 30, certain coding tools, e.g., deblocking, are modified to reflect this partitioning, although it is not provided in CU partitioning. For example, deblocking is called to filter these virtual block edges, in addition to edges of TUs and PUs, which is currently specified.

In some example, the information about finer granularity of the block partitioning can be signalled in the syntax elements of the bitstream, e.g., PPS, SPS, slice header, or provided to the decoder as a side information.

In some examples, constraints (e.g., effected by a clipping process) on maximal QP values, including deltaQP or chromaQP offset values, can be removed or extended to support a wider deviation of the QPe parameters from QPb utilizing video coding architectures similar to HEVC.

The above-described techniques of this disclosure may provide the following advantages over other techniques. The above-described techniques of this disclosure may avoid deltaQP signaling, thus inherently bringing bitrate reduction of a few percent compared to the deltaQP-based method of supporting HDR/WCG video data The above-described techniques of this disclosure allow for equal scaling of all transform coefficients of t(Cb), in contrast to the techniques in "De-quantization and scaling for next generation containers," J. Zhao, A. Segall, S.-H. Kim, K. Misra (Sharp), JVET document B0054, January 2016.

The above-described techniques of this disclosure may provide higher accuracy estimates of local brightness compared to the techniques in U.S. patent application Ser. No. 15/595,793, since decoded values provide for a better estimate than predicted samples.

The above-described techniques of this disclosure may allow a finer granularity of deltaQP derivation and application without an increase in signaling overhead associated with deltaQP-based solution The above-described techniques of this disclosure have a simpler implementation design, compared to transform scaling based designs of "De-quantization and scaling for next generation containers," and U.S. patent application Ser. No. 15/595,793.

Figure 11:
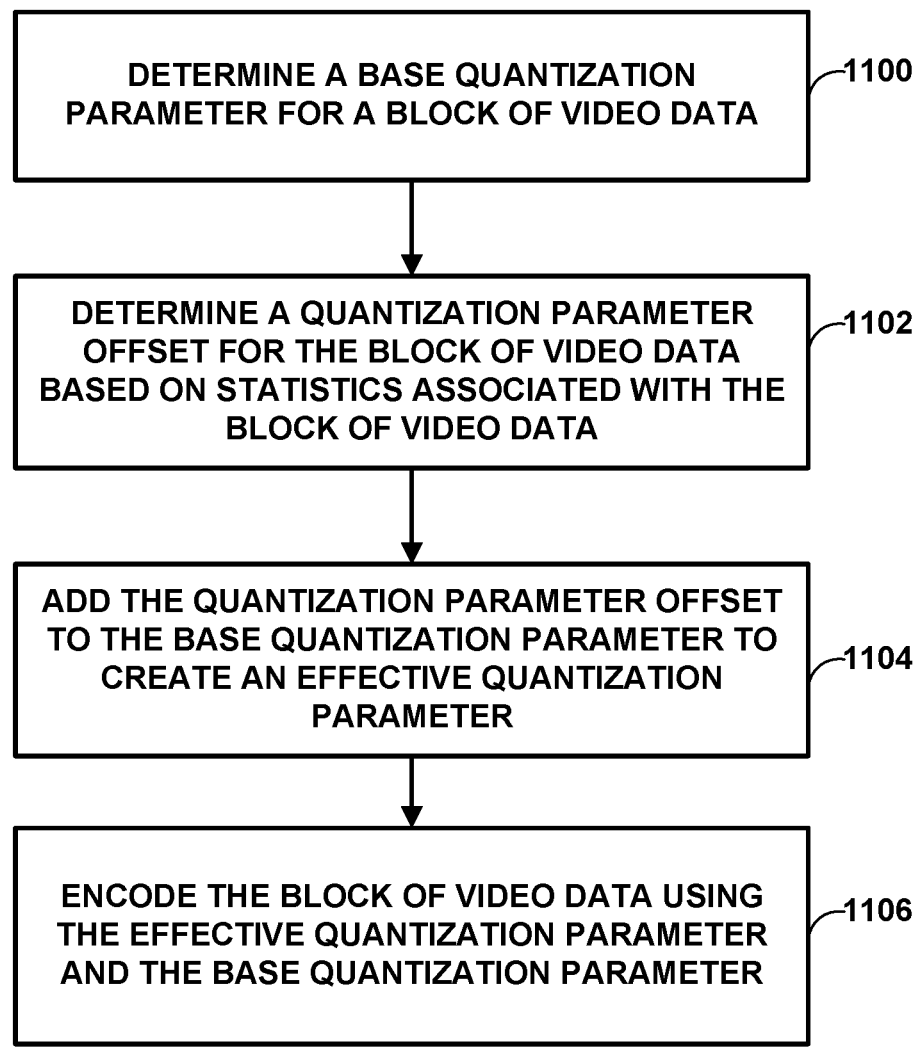
FIG. 11 is a flowchart illustrating an example encoding method.

FIG. 11 is a flowchart illustrating an example encoding method. Video encoder 20, including quantization unit 54, may be configured to perform the techniques of FIG. 11.

In one example of the disclosure, video encoder 20 may be configured to determine a base quantization parameter for the block of the video data (1100), and determine a quantization parameter offset for the block of the video data based on statistics associated with the block of the video data (1102). Video encoder 20 may be further configured to add the quantization parameter offset to the base quantization parameter to create an effective quantization parameter (1104), and encode the block of the video data using the effective quantization parameter and the base quantization parameter (1106). In one example, the base quantization parameter is the same for all of the blocks of the video data. In one example, the sample values of the video data are defined by a high dynamic range video data color format.

In a further example of the disclosure, to encode the block of the video data, video encoder 20 may be further configured to predict the block of the to produce residual samples, transform the residual samples to create transform coefficients, quantize the transform coefficients with the effective quantization parameter, inverse quantize the quantized transform coefficients with the effective quantization parameter to produce distorted transform coefficients, inverse transform the distorted transform coefficients to produce distorted residual samples, transform the distorted residual samples, and quantize the transformed distorted residual samples using the base quantization parameter.

In another example of the disclosure, to determine the quantization parameter offset, video encoder 20 may be further configured to determine the quantization parameter offset from a lookup table.

Figure 12:
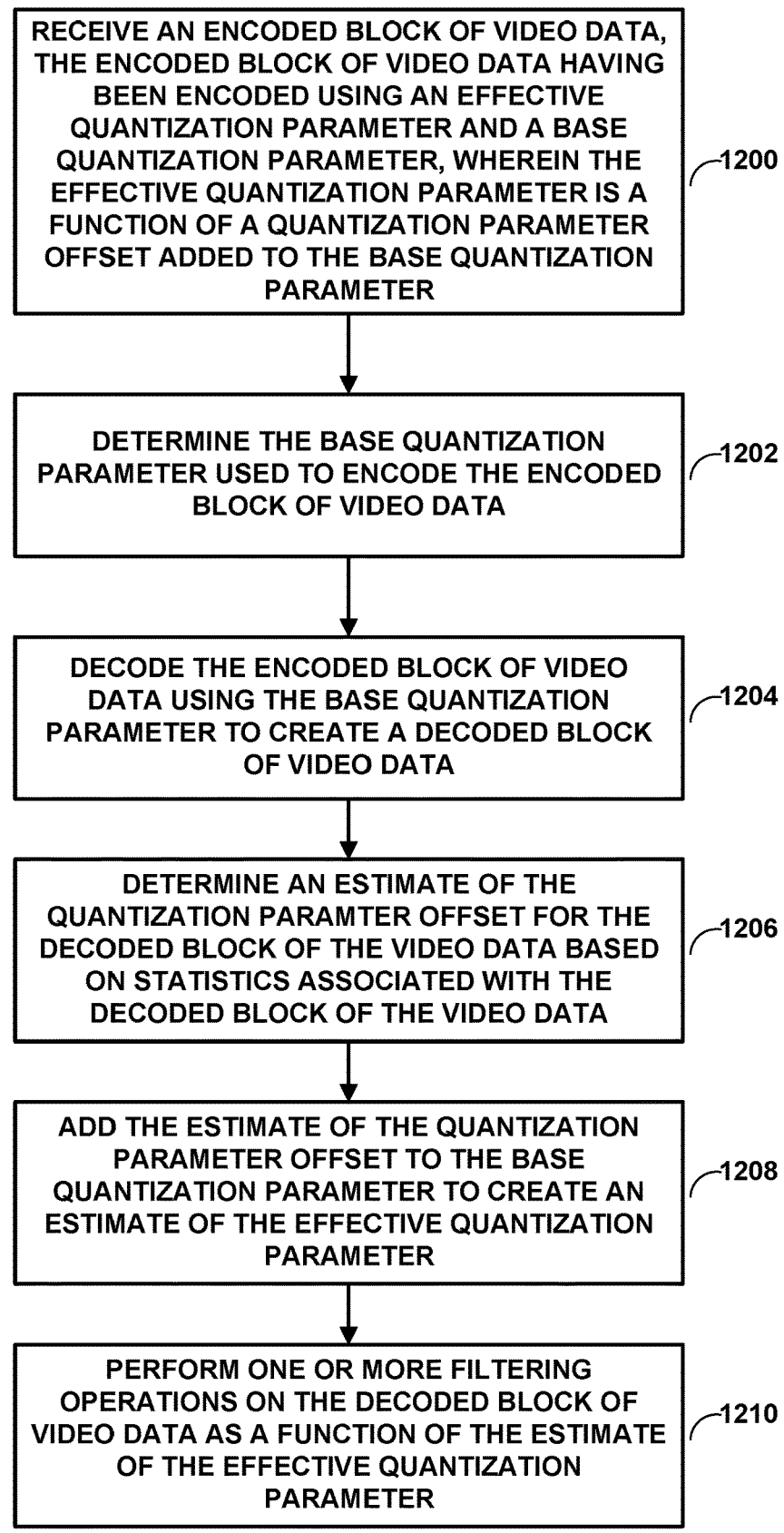
FIG. 12 is a flowchart illustrating an example decoding method.

FIG. 12 is a flowchart illustrating an example decoding method. Video decoder 30, including inverse quantization unit 76, QPe estimation unit 84, and filter unit 88, may be configured to perform the techniques of FIG. 12.

In one example of the disclosure, video decoder 30 may be configured to receive an encoded block of the video data, the encoded block of the video data having been encoded using an effective quantization parameter and a base quantization parameter, wherein the effective quantization parameter is a function of a quantization parameter offset added to the base quantization parameter (1200). Video decoder 30 may be further configured to determine the base quantization parameter used to encode the encoded block of the video data (1202), and decode the encoded block of the video data using the base quantization parameter to create a decoded block of video data (1204). Video decoder 30 may be further configured to determine an estimate of the quantization parameter offset for the decoded block of the video data based on statistics associated with the decoded block of the video data (1206), and add the estimate of the quantization parameter offset to the base quantization parameter to create an estimate of the effective quantization parameter (1208). Video decoder 30 may be further configured to perform one or more filtering operations on the decoded block of video data as a function of the estimate of the effective quantization parameter (1210). In one example, the base quantization parameter is the same for all of the blocks of the video data. In another example, sample values of the video data are defined by a high dynamic range video data color format.

In another example of the disclosure, to determine the base quantization parameter, video decoder 30 may be further configured to receive a base quantization parameter syntax element in an encoded video bitstream, a value of the base quantization paymaster syntax element indicating the base quantization parameter.

In another example of the disclosure, to decode the block of the video data, video decoder 30 may be further configured to entropy decode the encoded block of the video data to determine quantized transform coefficients, inverse quantize the quantized transform coefficient using the base quantization parameter to create transform coefficients, inverse transform the transform coefficients to create residual values, and perform a prediction process on the residual values to create the decoded block of the video data.

In another example of the disclosure, to determine the estimate of the quantization parameter offset for the decoded block of the video data, video decoder 30 may be further configured to determine an average of sample values of the decoded block of the video data, and determine the estimate of the quantization parameter offset for the decoded block of the video data using the average of the sample values of the decoded block of the video data.

In another example of the disclosure, to determine the estimate of the quantization parameter offset, video decoder 30 may be further configured to determine the estimate of the quantization parameter offset from a lookup table, wherein the average of the sample values is an input to the lookup table.

In another example of the disclosure, video decoder 30 may be further configured to determine the lookup table from a plurality of lookup tables.

In another example of the disclosure, to perform the one or more filtering operations on the decoded block of the video data, video decoder 30 may be further configured to apply a deblocking filter to the decoded block of video data using the effective quantization parameter.

In another example of the disclosure, to perform the one or more filtering operations on the decoded block of the video data, video decoder 30 may be further configured to apply a bilateral filter to the decoded block of video data using the effective quantization parameter.

Certain aspects of this disclosure have been described with respect to HEVC, extensions of the HEVC standard, and examples of JEM and VVC for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving an encoded block of the video data, the encoded block of the video data having been encoded using an effective quantization parameter and a base quantization parameter, wherein the effective quantization parameter is a function of a quantization parameter offset added to the base quantization parameter;
    determining the base quantization parameter used to encode the encoded block of the video data;
    decoding the encoded block of the video data using the base quantization parameter to create a decoded block of video data;
    determining an estimate of the quantization parameter offset for the decoded block of the video data;
    adding the estimate of the quantization parameter offset to the base quantization parameter to create an estimate of the effective quantization parameter; and
    performing one or more filtering operations on the decoded block of video data as a function of the estimate of the effective quantization parameter.

2. The method of claim 1, wherein the base quantization parameter is the same for all of the blocks of the video data.

3. The method of claim 1, wherein sample values of the video data are defined by a high dynamic range video data color format.

4. The method of claim 1, wherein determining the base quantization parameter comprises:
    receiving a base quantization parameter syntax element in an encoded video bitstream, a value of the base quantization paymaster syntax element indicating the base quantization parameter.

5. The method of claim 1, wherein decoding the encoded block of the video data comprises:
    entropy decoding the encoded block of the video data to determine quantized transform coefficients;
    inverse quantizing the quantized transform coefficient using the base quantization parameter to create transform coefficients;
    inverse transforming the transform coefficients to create residual values; and
    performing a prediction process on the residual values to create the decoded block of the video data.

6. The method of claim 1, wherein determining the estimate of the quantization parameter offset for the decoded block of the video data comprises:
    determining an average of sample values of the decoded block of the video data; and
    determining the estimate of the quantization parameter offset for the decoded block of the video data using the average of the sample values of the decoded block of the video data.

7. The method of claim 6, wherein determining the estimate of the quantization parameter offset comprises:
    determining the estimate of the quantization parameter offset from a lookup table, wherein the average of the sample values is an input to the lookup table.

8. The method of claim 7, further comprising:
    determining the lookup table from a plurality of lookup tables.

9. The method of claim 1, wherein performing the one or more filtering operations on the decoded block of the video data comprises:
    applying a deblocking filter to the decoded block of video data using the effective quantization parameter.

10. The method of claim 1, wherein performing the one or more filtering operations on the decoded block of the video data comprises:
    applying a bilateral filter to the decoded block of video data using the effective quantization parameter.

11. The method of claim 1, further comprising:
    determining the estimate of the quantization parameter offset for the decoded block of the video data based on sample values of the decoded block of the video data.

12. The method of claim 11, further comprising:
    determining the estimate of the quantization parameter offset using a lookup table based on the sample values of the decoded block of the video data.

13. An apparatus configured to decode video data, the apparatus comprising:
    a memory configured to store an encoded block of the video data; and
    one or more processors in communication with the memory, the one or more processors configured to:
        receive the encoded block of the video data, the encoded block of the video data having been encoded using an effective quantization parameter and a base quantization parameter, wherein the effective quantization parameter is a function of a quantization parameter offset added to the base quantization parameter;
        determine the base quantization parameter used to encode the encoded block of the video data;
        decode the encoded block of the video data using the base quantization parameter to create a decoded block of video data;
        determine an estimate of the quantization parameter offset for the decoded block of the video data;
        add the estimate of the quantization parameter offset to the base quantization parameter to create an estimate of the effective quantization parameter; and perform one or more filtering operations on the decoded block of video data as a function of the estimate of the effective quantization parameter.

14. The apparatus of claim 13, wherein the base quantization parameter is the same for all of the blocks of the video data.

15. The apparatus of claim 13, wherein sample values of the video data are defined by a high dynamic range video data color format.

16. The apparatus of claim 13, wherein to determine the base quantization parameter, the one or more processors are further configured to:
receive a base quantization parameter syntax element in an encoded video bitstream, a value of the base quantization paymaster syntax element indicating the base quantization parameter.

17. The apparatus of claim 13, wherein to decode the block of the video data, the one or more processors are further configured to:
entropy decode the encoded block of the video data to determine quantized transform coefficients;
inverse quantize the quantized transform coefficient using the base quantization parameter to create transform coefficients;
inverse transform the transform coefficients to create residual values; and
perform a prediction process on the residual values to create the decoded block of the video data.

18. The apparatus of claim 13, wherein to determine the estimate of the quantization parameter offset for the decoded block of the video data, the one or more processors are further configured to:
determine an average of sample values of the decoded block of the video data; and
determine the estimate of the quantization parameter offset for the decoded block of the video data using the average of the sample values of the decoded block of the video data.

19. The apparatus of claim 18, wherein to determine the estimate of the quantization parameter offset, the one or more processors are further configured to:
determine the estimate of the quantization parameter offset from a lookup table, wherein the average of the sample values is an input to the lookup table.

20. The apparatus of claim 18, wherein the one or more processors are further configured to:
determine the lookup table from a plurality of lookup tables.

21. The apparatus of claim 13, wherein to perform the one or more filtering operations on the decoded block of the video data, the one or more processors are further configured to:
apply a deblocking filter to the decoded block of video data using the effective quantization parameter.

22. The apparatus of claim 13, wherein to perform the one or more filtering operations on the decoded block of the video data, the one or more processors are further configured to:
apply a bilateral filter to the decoded block of video data using the effective quantization parameter.

23. The apparatus of claim 13, wherein the one or more processors are configured to determine the estimate of the quantization parameter offset for the decoded block of the video data based on sample values of the decoded block of the video data.

24. The apparatus of claim 23, wherein the one or more processors are configured to determine the estimate of the quantization parameter offset using a lookup table stored in the memory.

25. An apparatus configured to decode video data, the apparatus comprising:
means for receiving an encoded block of the video data, the encoded block of video the data having been encoded using an effective quantization parameter and a base quantization parameter, wherein the effective quantization parameter is a function of a quantization parameter offset added to the base quantization parameter;
means for determining the base quantization parameter used to encode the encoded block of the video data;
means for decoding the encoded block of the video data using the base quantization parameter to create a decoded block of video data;
means for determining an estimate of the quantization parameter offset for the decoded block of the video data;
means for adding the estimate of the quantization parameter offset to the base quantization parameter to create an estimate of the effective quantization parameter; and
means for performing one or more filtering operations on the decoded block of video data as a function of the estimate of the effective quantization parameter.

26. The apparatus of claim 25, wherein the one or more processors are configured to determine the estimate of the quantization parameter offset for the decoded block of the video data based on sample values of the decoded block of the video data.

27. The apparatus of claim 26, wherein the one or more processors are configured to determine the estimate of the quantization parameter offset using a lookup table stored in the memory, based on the sample values of the decoded block of the video data.

28. A non-transitory computer-readable storage medium storing instructions that, when executed, cause one or more processors to:
receive an encoded block of video data, the encoded block of the video data having been encoded using an effective quantization parameter and a base quantization parameter, wherein the effective quantization parameter is a function of a quantization parameter offset added to the base quantization parameter;
determine the base quantization parameter used to encode the encoded block of the video data;
decode the encoded block of the video data using the base quantization parameter to create a decoded block of video data;
determine an estimate of the quantization parameter offset for the decoded block of the video data;
add the estimate of the quantization parameter offset to the base quantization parameter to create an estimate of the effective quantization parameter; and
perform one or more filtering operations on the decoded block of video data as a function of the estimate of the effective quantization parameter.

29. The non-transitory computer-readable storage medium of claim 28, wherein the one or more processors are configured to determine the estimate of the quantization parameter offset for the decoded block of the video data based on sample values of the decoded block of the video data.

30. The non-transitory computer-readable storage medium of claim 29, wherein the one or more processors are configured to determine the estimate of the quantization parameter offset using a lookup table based on the sample values of the decoded block of the video data.

* * * * *